United States Patent
Yan et al.

(10) Patent No.: US 12,420,205 B2
(45) Date of Patent: Sep. 23, 2025

(54) METHOD FOR DISPLAYING GAME PICTURE, STORAGE MEDIUM, AND ELECTRONIC DEVICE

(71) Applicant: TENCENT TECHNOLOGY (SHENZHEN) COMPANY LIMITED, Shenzhen (CN)

(72) Inventors: Wenchao Yan, Shenzhen (CN); Hao Huang, Shenzhen (CN); Bin Qiu, Shenzhen (CN); Chaobin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 267 days.

(21) Appl. No.: 18/341,731

(22) Filed: Jun. 26, 2023

(65) Prior Publication Data

US 2023/0330545 A1    Oct. 19, 2023

Related U.S. Application Data

(63) Continuation of application No. PCT/CN2022/132187, filed on Nov. 16, 2022.

(30) Foreign Application Priority Data

Feb. 9, 2022    (CN) .......................... 202210122997.2

(51) Int. Cl.
*A63F 13/86* (2014.01)
*A63F 13/52* (2014.01)
(Continued)

(52) U.S. Cl.
CPC .............. *A63F 13/86* (2014.09); *A63F 13/52* (2014.09); *A63F 13/537* (2014.09); *A63F 13/837* (2014.09)

(58) Field of Classification Search
None
See application file for complete search history.

(56) References Cited

U.S. PATENT DOCUMENTS 8,634,943 B2 *   1/2014   Root ..................... A63F 13/812
                                                        463/2
10,155,160 B2 * 12/2018  van der Laan .... H04N 21/4781
(Continued)

FOREIGN PATENT DOCUMENTS

CN        108066986 A      5/2018
CN        110090449 A      8/2019
(Continued)

OTHER PUBLICATIONS

The World Intellectual Property Organization (WIPO) International Search Report for PCT/CN2022/132187 Feb. 10, 2023 12 Pages (including translation).
(Continued)

*Primary Examiner* — Reginald A Renwick
(74) *Attorney, Agent, or Firm* — Anova Law Group, PLLC

(57) ABSTRACT

A method includes obtaining a communication connection relationship between a first game client and a target virtual server in response to a target watching request triggered on the first game client for requesting to synchronously display in the first game client a game picture of a virtual game battle in which a second game client participates, in response to obtaining a target watching payload associated with the virtual game battle, adjusting a process number of target process(es) included in the target virtual server according to the target watching payload, and, in response to obtaining game picture data of the virtual game battle by the target virtual server after being adjusted, transmitting the game
(Continued)

picture data to the first game client through the communication connection relationship.

20 Claims, 10 Drawing Sheets

(51) Int. Cl.
  *A63F 13/537* (2014.01)
  *A63F 13/837* (2014.01)

(56) References Cited

U.S. PATENT DOCUMENTS

| | | | |
|---|---|---|---|
| 10,207,184 B1 | 2/2019 | Leung et al. | |
| 11,451,883 B2* | 9/2022 | Huske | H04N 21/43074 |
| 2014/0200083 A1 | 7/2014 | Tabata et al. | |
| 2015/0321098 A1* | 11/2015 | van der Laan | H04N 21/6125 |
| | | | 463/31 |
| 2017/0113129 A1* | 4/2017 | Doptis | A63F 13/28 |
| 2022/0219084 A1 | 7/2022 | Kanahara et al. | |

FOREIGN PATENT DOCUMENTS

| | | |
|---|---|---|
| CN | 111228824 A | 6/2020 |
| CN | 111821696 A | 10/2020 |
| CN | 112494957 A | 3/2021 |
| CN | 113274727 A | 8/2021 |
| CN | 113457171 A | 10/2021 |
| CN | 113633973 A | 11/2021 |
| CN | 114452642 A | 5/2022 |
| JP | 2000325657 A | 11/2000 |
| WO | 2021065993 A1 | 4/2021 |

OTHER PUBLICATIONS

China National Intellectual Property Administration (CNIPA) Office Action 1 for Application No. 202210122997.2 Jan. 27, 2025 10 Pages (including translation).

* cited by examiner

METHOD FOR DISPLAYING GAME PICTURE, STORAGE MEDIUM, AND ELECTRONIC DEVICE

CROSS-REFERENCE TO RELATED APPLICATIONS

This application is a continuation of International Application No. PCT/CN2022/132187, filed on Nov. 16, 2022, which claims priority to Chinese Patent Application No. 202210122997.2, entitled "METHOD FOR DISPLAYING GAME PICTURE, STORAGE MEDIUM, AND ELECTRONIC DEVICE" filed with the China National Intellectual Property Administration on Feb. 9, 2022, which are herein incorporated by reference in their entirety.

FIELD OF THE TECHNOLOGY

This application relates to the field of computers, and in particular to a method and an apparatus for displaying a game picture, a storage medium, an electronic device, and a computer program product.

BACKGROUND OF THE DISCLOSURE

A game client often provides a watching service to users. The watching service may be understood as recording a game picture generated in the whole process of a game of participating players, then directly forwarding the game picture from the game client to a player client with a watching needs, and displaying the game picture in the player client.

However, since the coupling degree between the watching service of the game client and a logic service in the game is generally heavy, a message generated during the whole game is forwarded through various logic services layer by layer, resulting in the problem of unstable payload of the watching service. For the problem, related art often needs to set an upper limit of service objects of the watching service in advance, and manual intervention is required for expansion after the payload of the watching service is excessively large, resulting in the problem of low display efficiency of the game picture. Therefore, the problem of low adaptability of display of the game picture is present.

Regarding the above problem, no effective solution has been proposed so far.

SUMMARY

In accordance with the disclosure, there is provided a method for displaying a game picture includes obtaining a communication connection relationship between a first game client and a target virtual server in response to a target watching request triggered on the first game client. The target watching request is used for requesting to synchronously display in the first game client a game picture of a virtual game battle in which a second game client participates, and the target virtual server includes one or more target processes. The method further includes, in response to obtaining a target watching payload associated with the virtual game battle, adjusting a process number of the one or more target processes included in the target virtual server according to the target watching payload. The target watching payload is a number of one or more resources born by the one or more target processes during watching of the virtual game battle. The method also includes, in response to obtaining game picture data of the virtual game battle by the target virtual server after being adjusted, transmitting the game picture data to the first game client through the communication connection relationship so as to synchronously display the game picture of the virtual game battle in the first game client.

Also in accordance with the disclosure, there is provided a method including obtaining a target watching request triggered on a first game client, the target watching request being used for requesting to synchronously display in the first game client a game picture of a virtual game battle in which a second game client participates, and establishing a communication connection relationship between the first game client and a target virtual server in response to the target watching request. The target virtual server includes one or more target processes, a process number of the one or more target processes is set to be adjusted according to a target watching payload associated with the virtual game battle, and the target watching payload is a number of one or more resources born by the one or more target processes during watching of the virtual game battle. The method further includes receiving game picture data of the virtual game battle transmitted by the target virtual server through the communication connection relationship, and synchronously displaying the game picture of the virtual game battle in the first game client.

Also in accordance with the disclosure, there is provided an electronic device including one or more memories storing one or more computer programs and one or more processors configured to execute the one or more computer programs to obtain a communication connection relationship between a first game client and a target virtual server in response to a target watching request triggered on the first game client. The target watching request is used for requesting to synchronously display in the first game client a game picture of a virtual game battle in which a second game client participates, and the target virtual server includes one or more target processes. The one or more processors are further configured to execute the one or more computer programs to, in response to obtaining a target watching payload associated with the virtual game battle, adjust a process number of the one or more target processes included in the target virtual server according to the target watching payload. The target watching payload is a number of one or more resources born by the one or more target processes during watching of the virtual game battle. The one or more processors are also configured to execute the one or more computer programs to, in response to obtaining game picture data of the virtual game battle by the target virtual server after being adjusted, transmit the game picture data to the first game client through the communication connection relationship so as to synchronously display the game picture of the virtual game battle in the first game client

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

The accompanying drawings described herein are used to provide a further understanding of this application, and form part of this application. Exemplary embodiments of this application and descriptions thereof are used to explain this application, and do not constitute any inappropriate limitation to this application. In the accompanying drawings.

DESCRIPTION OF EMBODIMENTS

Figure 1:
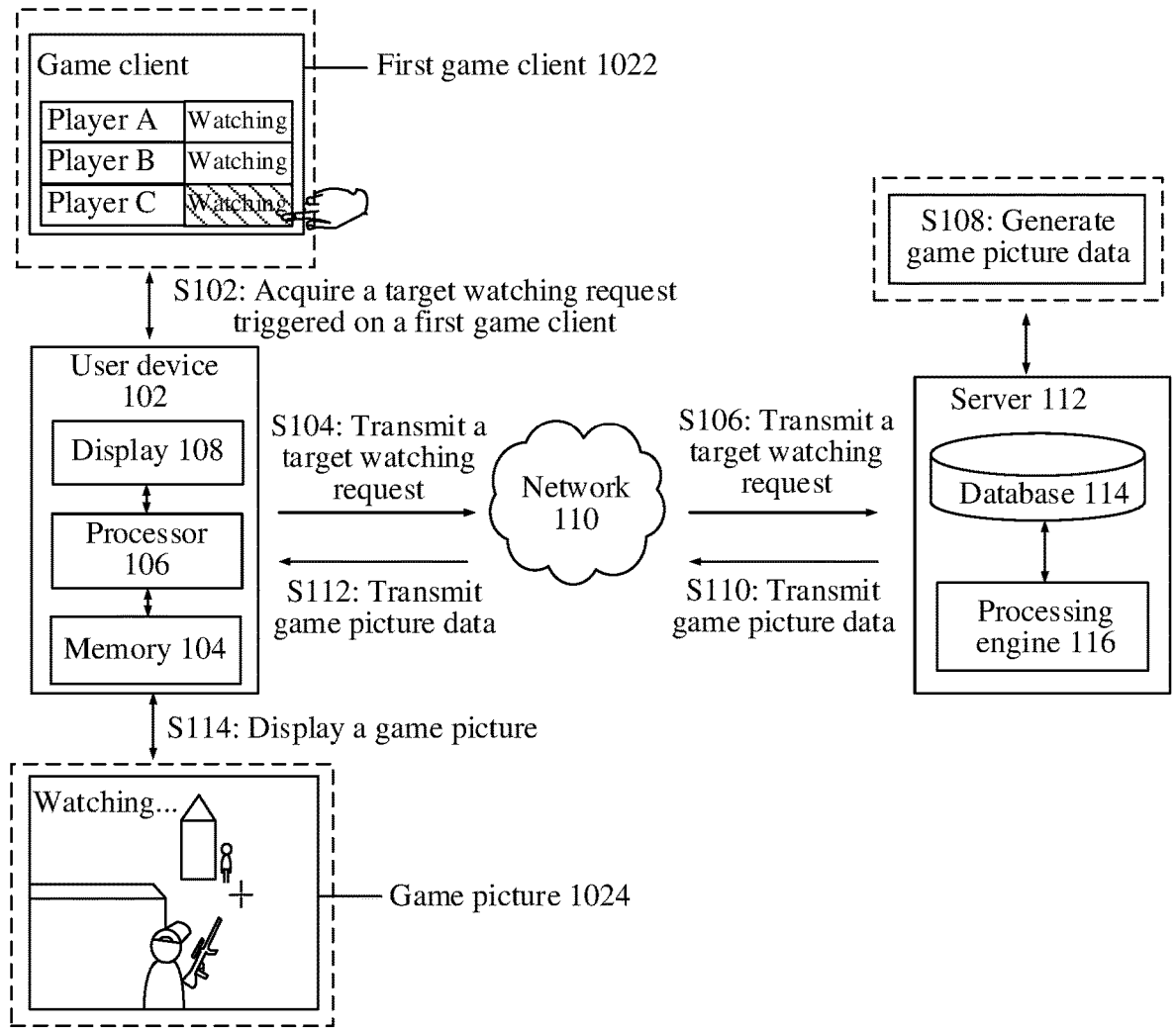
FIG. 1 is a schematic diagram showing an application environment of an optional method for displaying a game picture according to an embodiment of this application.

In order to make those skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by those of ordinary skill in the art based on the embodiments of this application without creative efforts shall fall within the protection scope of this application.

In the specification, claims, and the foregoing accompanying drawings of this application, the terms "first," "second" and the like are intended to distinguish between similar objects rather than indicating a specific order or an order of precedence. It is to be understood that such used data is interchangeable in appropriate cases so that the embodiments of this application described here can be implemented in an order other than those illustrated or described here. Moreover, the terms "include," "have" and any other variants thereof mean to cover the non-exclusive inclusion, for example, a process, method, system, product, or device that includes a list of steps or units is not necessarily limited to those expressly listed steps or units, but may include other steps or units not expressly listed or inherent to such process, method, system, product, or device. Further, the steps are not necessarily performed in the same order as they are described in this disclosure.

First, to facilitate understanding of the embodiments of this application, some terms or nouns involved in this application are explained and described below:

Multiplayer online game (MMOG).

Watching: the action of watching a game competition of other people from a third-party perspective in a game event.

Cloud native: distributed cloud based on distributed deployment and unified transportation, a set of cloud technology product system established on the basis of technologies such as container, micro-service, and DevOps.

Gamesvr: a non-competitive-event-game logic process.

GlobalGamesvr: a process which has the isomorphism with Gamesvr, in which players perform game competitive events.

MiscProxysvr: a process of forwarding a watching protocol message to a message queue.

WatchSvr: a management process of watching event information.

WatchPod: watching protocol message consumption and processing service.

MsgQueue: a message queue, used for transmitting and saving messages related to events.

PVP: competitive confrontation between players in the game.

Ckafka: a cloud message queue compatible with open source Kafka.

CS: C represents client, S represents Server, and CS is used for representing communication between the client and the server.

SS: both S's represent Server, and SS is used for representing communication inside the server.

Protocol: a set of rule, standard, or agreement established for data exchange in a computer network.

Id: a unique identifier.

Request: a network transmission protocol.

According to one aspect of the embodiments of this application, a method for displaying a game picture is provided, optionally, as an optional implementation, the method for displaying the game picture may be applied to, but is not limited to an environment shown in FIG. 1. It may include but not limited to a user device 102, a network 110 and a server 112, where the user device 102 may include but not limited to a display 108, a processor 106, and a memory 104.

A specific process may be as follows:

step S102: the user device 102 obtains a target watching request triggered on a first game client 1022, where the target watching request is used for requesting to synchronously display in the first game client 1022 a game picture of a virtual game battle in which a second game client (a client where a player C is) participates;

steps S104-S106: the user device 102 transmits the target watching request to the server 112 through the network 110;

step S108: the server 112 searches a communication connection relationship corresponding to the target watching request and a target watching payload associated with the virtual game battle through a database 114, and adjusts the process number (i.e., the number of processes) of target processes included in the target virtual server through a processing engine 116 according to the target watching payload, and obtains game picture data of the virtual game battle by the adjusted target virtual server so as to generate game picture data; and steps S110-S112: the server 112 transmits the game picture data to the user device 102 through the network 110, and the processor 106 in the user device 102 displays a game picture 1024 corresponding to the game picture data in the display 108 and stores the game picture data in the memory 104.

In addition to the example shown in FIG. 1, the above steps may be independently completed by the user device 102, that is, the step of generating the game picture data is performed by the user device 102, thereby reducing the processing pressure of the server. The user device 102 includes but not limited to a hand-held device (such as a mobile phone), a notebook computer, a desktop computer and a vehicle-mounted device. This application does not limit the specific implementation of the user device 102.

Figure 2:
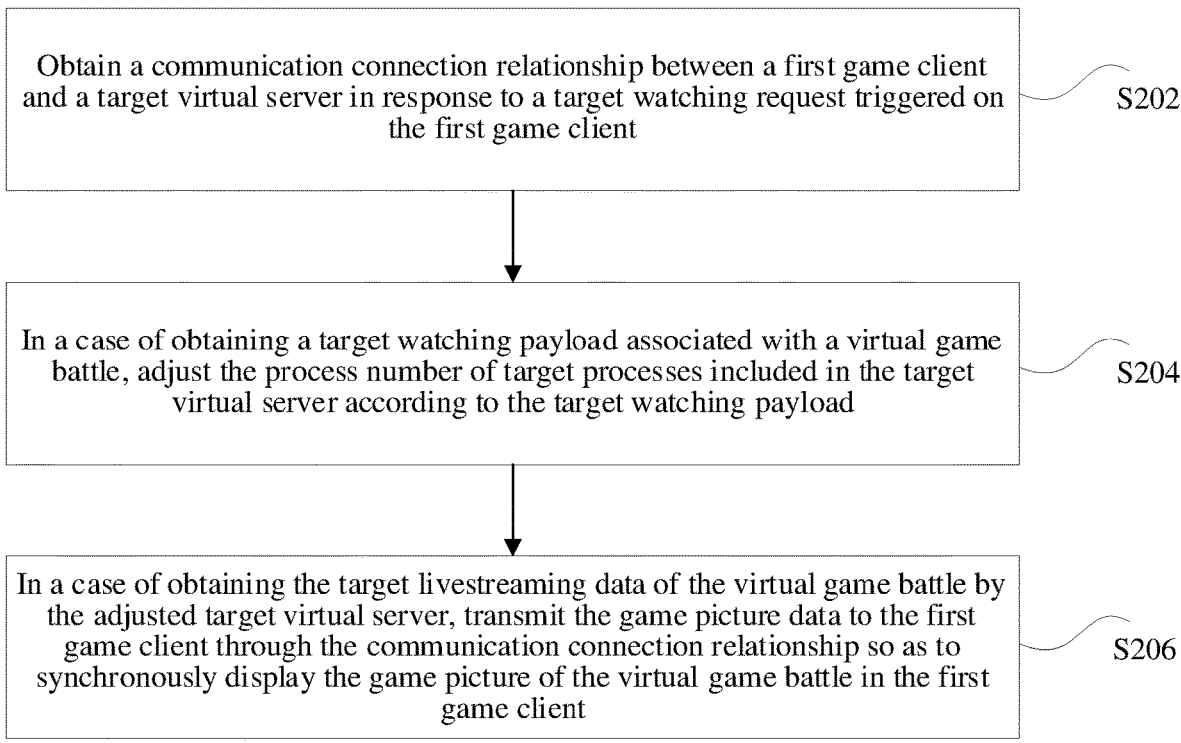
FIG. 2 is a schematic diagram showing a procedure of an optional method for displaying a game picture according to an embodiment of this application.

Optionally, as an optional implementation, as shown in FIG. 2, a method for displaying a game picture is provided. Taking the case where the method is applied to the server shown in FIG. 1 as an example, the method includes:

S202: obtain a communication connection relationship between a first game client and a target virtual server in response to a target watching request triggered on the first game client, where the target watching request is used for requesting to synchronously display in the first game client a game picture of a virtual game battle in which a second game client participates, the target virtual server includes target processes, the target processes are processes deployed in a cloud; and where the target virtual server may include a plurality of target processes, for example, may include one group of target processes, or may include a plurality of groups of target processes.

S204: in a case of obtaining a target watching payload associated with the virtual game battle, adjust the process number of the target processes included in the target virtual server according to the target watching payload, where the target watching payload is the number of resources born by the target processes during watching of the virtual game battle;

S206: in a case of obtaining game picture data of the virtual game battle by the adjusted target virtual server, transmit game picture data to the first game client through the communication connection relationship so as to synchronously display the game picture of the virtual game battle in the first game client, where the game picture data may be target livestreaming data, and the target livestreaming data is data of the game picture of the virtual game battle waiting to be displayed synchronously in the first game client.

Optionally, the foregoing method for displaying the game picture may be applied to, but not limited to a watching scenario of a competitive event of a virtual game. In view of the fact that the number of users who watch a game on line at the same time in a virtual game may reach ten thousand, even million magnitude, and the amount of messages generated by recording an event is large, so it is needed to consider what kind of message forwarding mechanism is adopted to meet the high-throughput service requirement. In this embodiment, however, when the game is watched in the game client, the client is connected to the target virtual server first, a communication connection relationship between the client and the target virtual server is established, and then a message (such as game picture data) is pulled from the message queue by the target virtual server to provide a corresponding watching service for the watching game client. Since the target virtual server is a service process deployed in the cloud, it may achieve the complete decoupling with a logic service of a current game client, and may realize automatic telescopic dynamic adjustment according to the target watching payload of a current watching service, so that the target virtual server is dynamically adjusted as a payload-balanced state, thereby improving the efficiency of the game picture corresponding to the watching service and ensuring the user experience of providing the watching service corresponding to the watching game client.

Optionally, the game client is essentially different from the livestreaming client generally configured to only provide a watching service, for example, the game client may provide, but not limited to an internal logic service of the virtual game in addition to providing the watching service of the virtual game, so that in the running process of the game client, the case that the watching service of the virtual game and the internal logic service of the virtual game are seriously coupled may easily exist, so that the livestreaming data generated by the watching service is forwarded by various logic services layer by layer in the process of providing the watching service for a watching party, thereby resulting in the limited number of participating objects which the watching service provided by the game client faces, generally, the watching object is only limited to the objects which have been eliminated in a single event.

In this embodiment, however, to overcome the problem of serious coupling degree between various services in the game client, through the communication connection relationship between the first game client and the target virtual server, the target watching payload serves as an adjustment basis and the process number of the target processes which are deployed in the cloud and used for synchronously displaying in the first game client the game picture of the virtual game battle in which the second game client participates is automatically adjusted, so that the coupling degree between various services in the game client is reduced, and the user experience during watching is ensured by the foregoing automatic adjustment mode.

Figure 3:
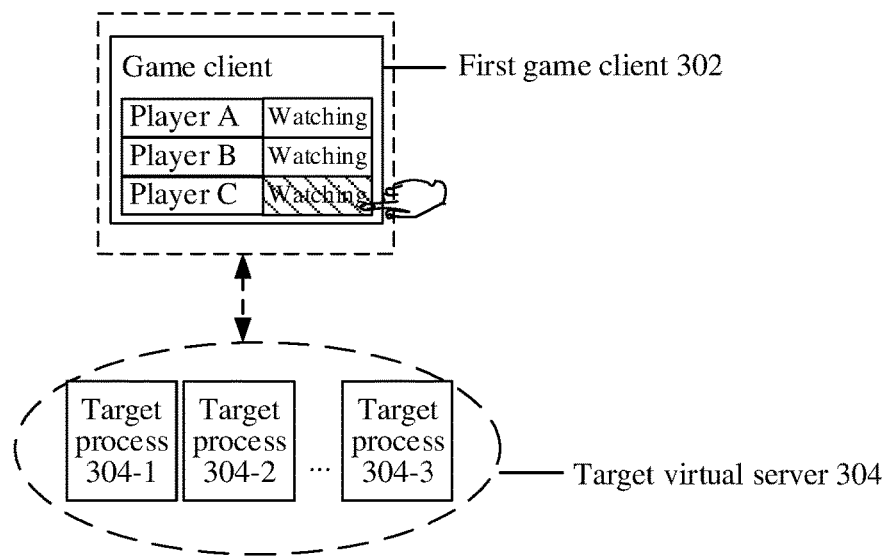
FIG. 3 is a schematic diagram showing an optional method for displaying a game picture according to an embodiment of this application.

Optionally, in this embodiment, as shown in FIG. 3, the communication connection relationship between the first game client 302 and the target virtual server 304 is obtained in response to the target watching request triggered on the first game client 302, where the target watching request is used for requesting to synchronously display in the first game client 302 the game picture of the virtual game battle in which the second game client (such as the game client where the player C is) participates, the target virtual server 304 includes one group of target processes (such as a target process 304-1, a target process 304-2 and a target process 304-3), and the target processes are processes deployed in the cloud.

Optionally, in this embodiment, the target virtual server may be, but not limited to a service deployed in the cloud, such as a game message consumer server (WatchPod). When a player in the game watches the game, the client is connected to a certain WatchPod first, and then a message is pulled from the cloud message queue for playback. The target virtual server may further be understood as, but not limited to one group of processes deployed to the cloud, and the number of the processes may be automatically expanded according to a current payload. It may basically achieve the decoupling from the current service through the foregoing target virtual server, and may automatically expand and retract according to the current service to dynamically reach a payload-balanced state, thereby ensuring the watching experience of the player.

Optionally, in this embodiment, the communication connection relationship may be but not limited to an association relationship that is actively or passively established by the first game client or the target virtual server in response to the target watching request triggered on the first game client. After the communication connection relationship is established, data transmission or information interaction between the first game client and the target virtual server may be performed by the communication connection relationship.

Optionally, in this embodiment, the virtual game battle in which the second game client participates may be but not limited to a virtual game battle corresponding to an internal logic service provided in the first game client, or may be but not limited to a virtual game battle corresponding to an internal logic service provided in a non-first game client, that is, the virtual game battle in which the second game client participates may be a virtual game battle in which the first game client participates, that is, the first game client also participates in the virtual game battle. The virtual game battle in which the second game client participates may also be a virtual game battle in which the non-first game client participates, that is, the first game client only watches the game and does not participate in the virtual game object. However, in a case that the virtual game battle in which the second game client participates is a virtual game battle corresponding to an internal logic service provided in the first game client, the problem of the serious coupling degree between various services in the game client will be more obvious, and it is more suitable for the implementation of the foregoing method for displaying the game picture.

Optionally, in this embodiment, the target watching payload is the number of resources born by the target processes during watching of the virtual game battle, where the number of the resources may be understood as, but not limited to, the number of users of the virtual game battle or the born traffic. Moreover, the size of the target watching payload may be, but not limited to, positively correlated to the number of the resources born by the target processes. For example, the more resources the target processes bear, the larger the target watching payload is, and vice versa. In addition, the process number of the target processes may be, but not limited to, positively correlated to the size of the target watching payload. For example, the larger the target watching payload is, the larger the process number of the target processes is, and vice versa.

Optionally, in this embodiment, the game picture data may include but not limited to game process data of the virtual game battle. Furthermore, in the process of synchronously displaying the game picture of the virtual game battle in the first game client, the first client may, but not limited to, flexibly adjust the display process of the game picture of the virtual game battle, and the display angle of the game picture of the virtual game battle, where the display angle may be understood as, but not limited to, the viewing angle corresponding to each client participating in the virtual game battle, that is, the first game client may watch the game battle from the viewing angle corresponding to the second game client while watching, or from the viewing angle corresponding to other game clients in the virtual game battle.

Figure 4:
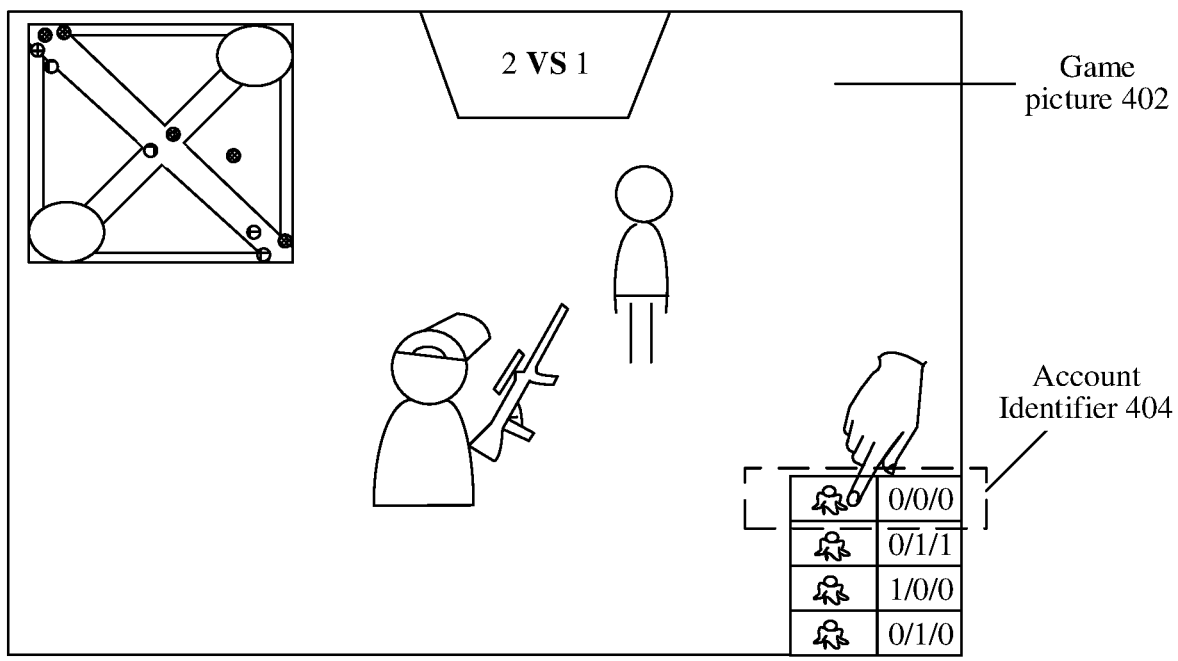
FIG. 4 is a schematic diagram showing another optional method for displaying a game picture according to an embodiment of this application.

For further illustration, optionally, for example, as shown in FIG. 4, in the process of synchronously displaying the game picture of the virtual game battle in the first game client, a game picture 402 under the viewing angle associated with a client corresponding to an account identifier 404 in response to a playing request triggered on the account identifier 404.

The communication connection relationship between the first game client and the target virtual server is obtained in response to a target watching request triggered on the first game client, where the target watching request is used for requesting to synchronously display in the first game client a game picture of a virtual game battle in which a second game client participates, the target virtual server includes one group of target processes and the target processes are processes deployed in the cloud. In a case of obtaining a target watching payload associated with the virtual game battle, the process number of the target processes included in the target virtual server is adjusted according to the target watching payload, where the target watching payload is the number of resources born by the target processes during watching of the virtual game battle. In a case of obtaining the game picture data of the virtual game battle by the adjusted target virtual server, the game picture data is transmitted to the first game client through the communication connection relationship so as to synchronously display the game picture of the virtual game battle in the first game client.

Figure 5:
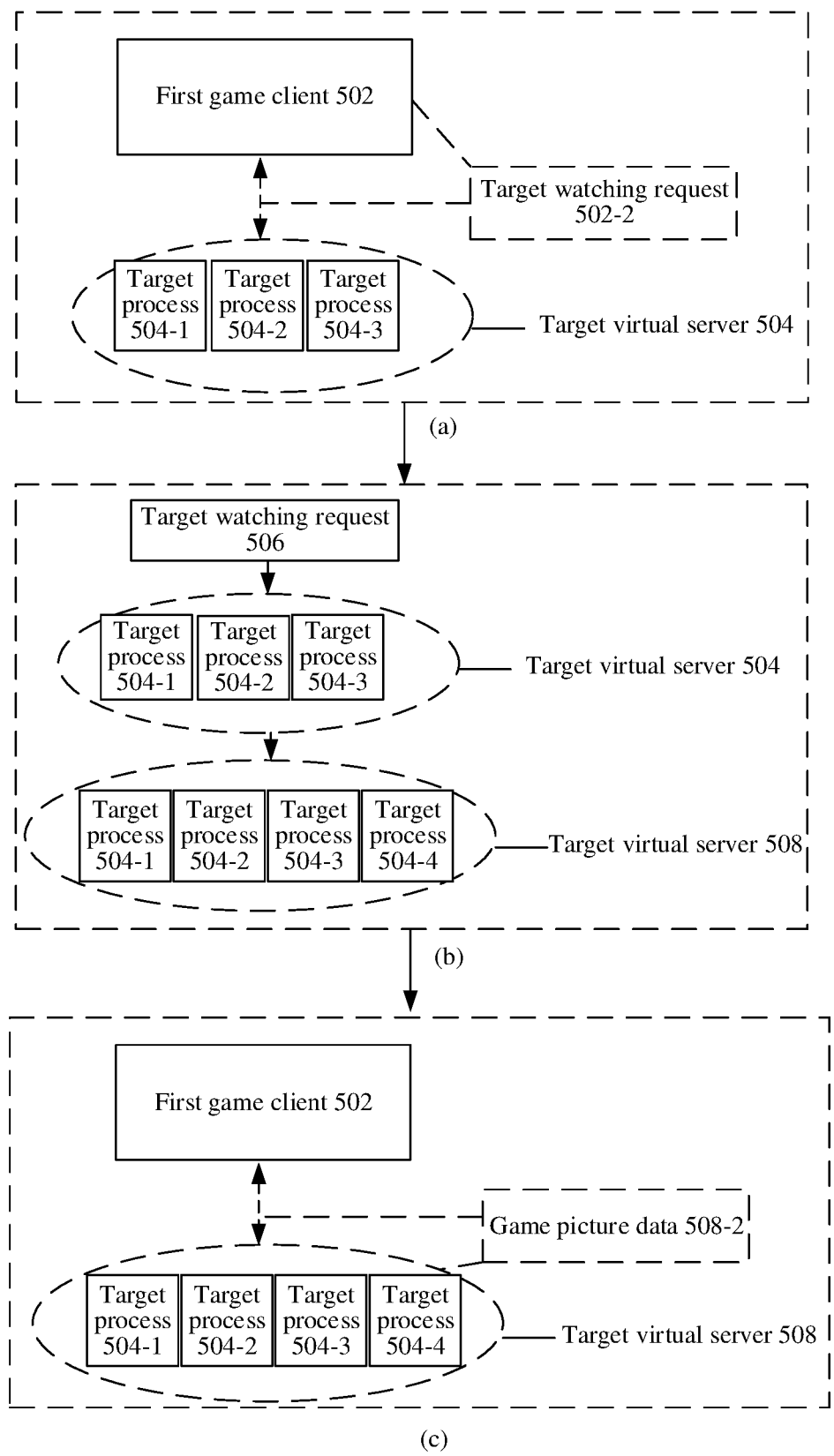
FIG. 5 is a schematic diagram showing another optional method for displaying a game picture according to an embodiment of this application.

For further illustration, optionally, for example, as shown in FIG. 5, a communication connection relationship between a first game client 502 and a target virtual server 504 is obtained in response to a target watching request 502-2 triggered on the first game client 502, as shown in (a) in FIG. 5, where the target watching request 502-2 is used for requesting to synchronously display in the first game client a game picture of a virtual game battle in which a second game client participates 502; the target virtual server 504 includes one group of target processes (such as a target process 504-1, a target process 504-2 and a target process 504-3); and the target processes are processes deployed in the cloud.

Moreover, as shown in (b) in FIG. 5, in a case of obtaining a target watching payload 506 associated with the virtual game battle, the process number of the target processes included in the target virtual server 504 is adjusted according to the target watching payload 506 to obtain the adjusted target virtual server 508 (such as a target process 504-1, a target process 504-2, a target process 504-3 and a target process 504-4), where the target watching payload 506 is the number of resources born by the target processes during watching of the virtual game battle.

In addition, as shown in (c) in FIG. 5, in a case of obtaining game picture data 508-2 of the virtual game battle by the adjusted target virtual server 508, the game picture data 508-2 is transmitted to the first game client 502 through the communication connection relationship so as to synchronously display the game picture of the virtual game battle in the first game client 502, where the game picture data 508-2 is data of the game picture of the virtual game battle waiting to be displayed in the first game client 502.

Through the embodiments provided by this application, the communication connection relationship between the first game client and the target virtual server is obtained in response to a target watching request triggered on the first game client, where the target watching request is used for requesting to synchronously display in the first game client a game picture of a virtual game battle in which a second game client participates, the target virtual server includes one group of target processes, and the target processes are processes deployed in the cloud. In a case of obtaining a target watching payload associated with the virtual game battle, the process number of the target processes included in the target virtual server is adjusted according to the target watching payload, where the target watching payload is the number of resources born by the target processes during watching of the virtual game battle. In a case of obtaining the game picture data of the virtual game battle by the adjusted target virtual server, the game picture data is transmitted to the first game client through the communication connection relationship so as to synchronously display the game picture of the virtual game battle in the first game client, where the game picture data is data of the game picture of the virtual game battle waiting to be synchronously displayed in the first game client. Through the communication connection relationship between the first game client and the target virtual server, the target watching payload serves as an adjustment basis, and the process number of the target processes which are deployed in the cloud and used for synchronously displaying in the first game client the game picture of the virtual game battle in which the second game client participates is automatically adjusted, reaching the purpose that the process number of the target processes for synchronously displaying the game picture is adjusted in time, thereby achieving the technical effect of improving the display efficiency of the game picture.

As an optional solution, adjusting the process number of the target processes which the target virtual server comprises according to the target watching payload includes:
S1: in a case that the target watching payload is greater than or equal to a first payload threshold, increase the process number of the target processes included in the target virtual server; or
S2: in a case that the target watching payload is less than or equal to a second payload threshold, reduce the process number of the target processes included in the target virtual server.

Optionally, in this embodiment, the target watching payload is the number of resources born by the target processes during watching of the virtual game battle, where the number of the resources may be understood as, but not limited to, the number of users of the virtual game battle or the born traffic. Moreover, the size of the target watching payload may be, but not limited to, positively correlated to the number of the resources born by the target processes. For example, the more resources the target processes bear, the larger the target watching payload is, and vice versa. In addition, the process number of the target processes may be, but not limited to, positively correlated to the size of the target watching payload. For example, the larger the target watching payload is, the larger the process number of the target processes is, and vice versa. The first payload threshold and the second payload threshold are preset thresholds of the target watching payload. The first payload threshold and the second payload threshold may be set according to requirements. The first payload threshold may be greater than the second payload threshold.

Optionally, in this embodiment, increasing the process number of the target processes included in the target virtual server may be, but not limited to, positively correlated to the target watching payload relative to the payload quantity of the first payload threshold, that is, the more the target watching payload exceeds the payload quantity of the first payload threshold, the more the process data of the target processes is increased; and reducing the process number of the target processes included in the target virtual server may be, but not limited to, positively correlated to the target watching payload relative to the payload quantity of the second payload threshold, that is, the more the target watching payload is less than the payload quantity of the second payload threshold, the more the process data of the target processes is reduced.

As an optional solution, adjusting the process number of the target processes which the target virtual server comprises according to the target watching payload includes:
S1: in a case that the target watching payload is within the first payload range, adjust the process number of the target processes included in the target virtual server to the process number corresponding to the first payload range; or
S2: in a case that the target watching payload is within the second payload range, adjust the process number of the target processes included in the target virtual server to the process number corresponding to the second payload range.

Optionally, in this embodiment, the target watching payload is the number of resources born by the target processes during watching of the virtual game battle, where the number of the resources may be understood as, but not limited to, the number of users of the virtual game battle or the born traffic. Moreover, the size of the target watching payload may be, but not limited to, positively correlated to the number of the resources born by the target processes. For example, the more resources the target processes bear, the larger the target watching payload is, and vice versa. In addition, the process number of the target processes may be, but not limited to, positively correlated to the size of the target watching payload. For example, the larger the target watching payload is, the larger the process number of the target processes is, and vice versa. The first payload range and the second payload range may be preset payload ranges. The first payload range and the second payload range may be different.

To improve the adjustment pertinence of the process number of the target processes, it may be but not limited to that the process number of the target processes is adjusted according to the adjustment basis where the target watching payload is within the payload range.

Through the embodiments provided by this application, in a case that the target watching payload is within the first payload range, the process number of the target processes included in the target virtual server is adjusted as the process number corresponding to the first payload range; or in a case that the target watching payload is within the second payload range, the process number of the target processes included in the target virtual server is adjusted to the process number corresponding to the second payload range, reaching the purpose of pertinently adjusting the process number of the target processes and improving the adjustment pertinence of the process number of the target processes.

As an optional solution, before transmitting the game picture data to first game client through the communication connection relationship, the method includes the following steps:
S1: transmit a data pulling request to a target message queue, where the target message queue is used for caching game picture data of a virtual game battle, and the data pulling request is used for requesting to pull the game picture data cached in the target message queue; and
S2: receive the game picture data returned by the target message queue.

Optionally, the target message queue may be but not limited to a cloud message queue, so that in this embodiment, the cloud message queue is taken as an intermediary of message transmission, and in addition to the inherent functional characteristic of high throughput, the cloud message queue has the characteristics of high reliability and high retractility.

The data pulling request is transmitted to the target message queue, where the target message queue is used for caching data of the game picture of the virtual game battle, and the data pulling request is used for requesting to pull the game picture data cached in the target message queue; and the game picture data returned by the target message queue is received.

Figure 6:
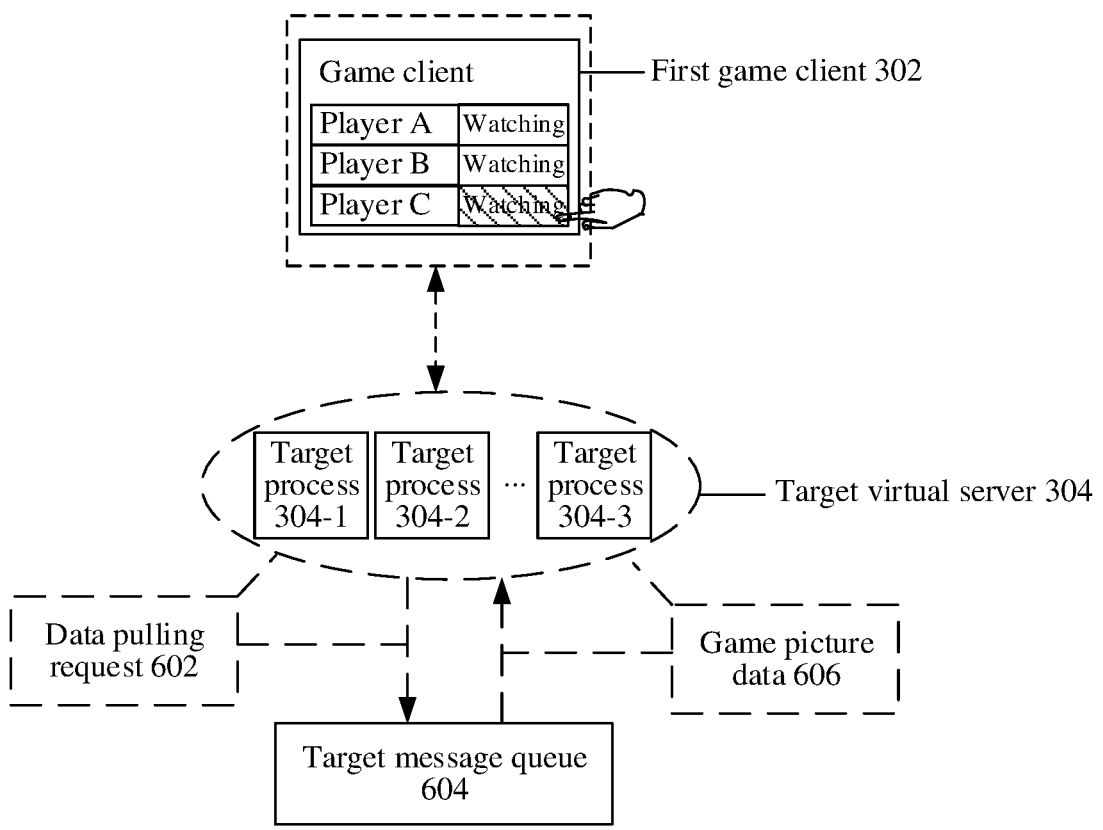
FIG. 6 is a schematic diagram showing another optional method for displaying a game picture according to an embodiment of this application.

For further illustration, optionally based on the scenario shown in FIG. 3, as shown in FIG. 6, the target virtual server 304 transmits a data pulling request 602 to a target message queue 604, where the target message queue 604 is used for caching data of a game picture of a virtual game battle, and the data pulling request 602 is used for requesting to pull game picture data 606 cached in the target message queue 604; and the target virtual server 304 receives the game picture data 606 returned by the target message queue 604.

As an optional solution, the transmitting a data pulling request to a target message queue includes: transmit the data pulling request to the target message queue, where the data pulling request further carries a battle identifier of the virtual game battle and a picture timestamp of the game picture of the virtual game battle.

As an optional solution the receiving the game picture data returned by the target message queue includes: Receiving livestreaming data that is returned by the target message queue and matches the battle identifier and the picture timestamp.

Optionally, in this embodiment, the battle identifier may be, but not limited to, a battle identifier of the virtual game battle which is requested by the target watching request to be synchronously displayed in the first game client and which the second game client participates in; and the picture timestamp may be, but not limited to, a picture timestamp corresponding to time information when the target watching request is triggered, or a picture timestamp corresponding to time information of the display progress of the virtual game battle which is requested by the target watching request to be synchronously displayed in the first game client and which the second game client participates in. Different virtual game battles have different battle identifiers, and different game pictures in the same virtual game battle have different picture timestamps.

Through the embodiments provided by this application, the data pulling request is transmitted to the target message queue, where the data pulling request further carries the battle identifier of the virtual game battle, and the picture timestamp of the game picture of the virtual game battle; and livestreaming data that is returned by the target message queue and matches the battle identifier and the picture timestamp is received, reaching the purpose of accurately displaying the watching game picture and improving the display accuracy of the game picture.

Figure 7:
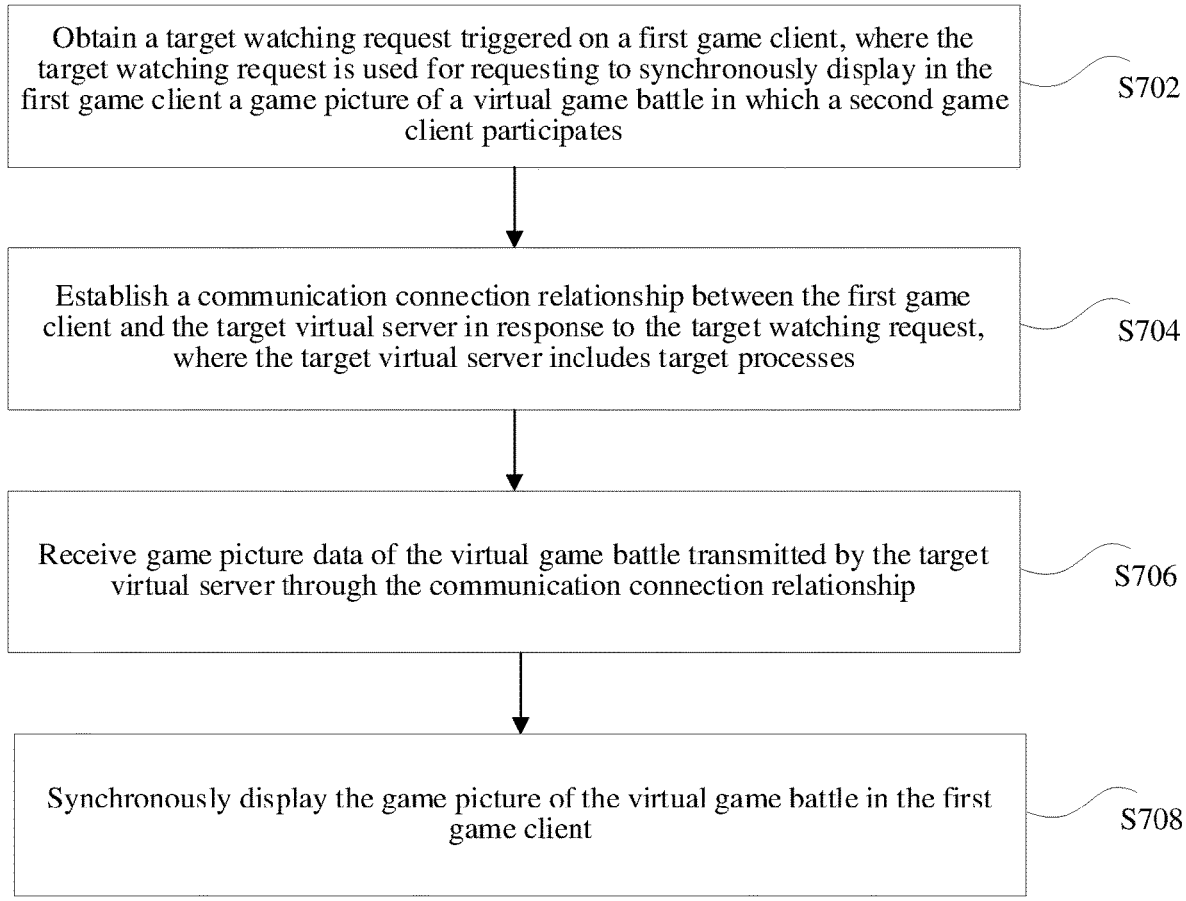
FIG. 7 is a schematic diagram showing another optional method for displaying a game picture according to an embodiment of this application.

Optionally, as an optional implementation, as shown in FIG. 7, a method for displaying a game picture is provided. Taking the case where the method is applied to user device shown in FIG. 1 as an example, the method includes:

S702: obtain a target watching request triggered on a first game client, where the target watching request is used for requesting to synchronously display in the first game client a game picture of a virtual game battle in which a second game client participates.

S704: establish a communication connection relationship between the first game client and the target virtual server in response to the target watching request, where the target virtual server includes target processes, the process number of the target processes is set to be adjusted according to a target watching payload associated with the virtual game battle, and the target watching payload is the number of resources born by the target processes during watching of the virtual game battle. The target virtual server may also include one group of target processes, where the target processes are processes deployed in the cloud, and the process number of the group of processes may be also set to be adjusted according to the target watching payload associated with the virtual game battle.

S706: receive game picture data of the virtual game battle transmitted by the target virtual server through the communication connection relationship.

S708: synchronously display the game picture of the virtual game battle in the first game client.

Optionally, the foregoing method for displaying the game picture may be applied to, but not limited to a watching scenario of a competitive event of a virtual game. In view of the fact that the number of users who watch a game on line at the same time in a virtual game may reach ten thousand, even million magnitude, and the amount of messages generated by recording an event is large, so it is needed to consider what kind of message forwarding mechanism is adopted to meet the high-throughput service requirement. In this embodiment, however, when the game is watched in the game client, the client is connected to the target virtual server first, a communication connection relationship between the client and the target virtual server is established, and then a message (such as game picture data) is pulled from the message queue by the target virtual server to provide a corresponding watching service for the watching game client. Since the target virtual server is a service process deployed in the cloud, it may achieve the complete decoupling with a logic service of a current game client, and may realize automatic telescopic dynamic adjustment according to the target watching payload of a current watching service, so that the target virtual server is dynamically adjusted as a payload-balanced state, thereby improving the efficiency of the game picture corresponding to the watching service and ensuring the user experience of providing the watching service corresponding to the watching game client.

Optionally, the game client is essentially different from the livestreaming client generally configured to only provide a watching service, for example, the game client may provide, but not limited to an internal logic service of the virtual game in addition to providing the watching service of the virtual game, so that in the running process of the game client, the case that the watching service of the virtual game and the internal logic service of the virtual game are seriously coupled may easily exist, so that the livestreaming data generated by the watching service is forwarded by various logic services layer by layer in the process of providing the watching service for a watching party, thereby resulting in the limited number of participating objects which the watching service provided by the game client faces, generally, the watching object is only limited to the objects which have been eliminated in a single event.

In this embodiment, however, to overcome the problem of serious coupling degree between various services in the game client, through the communication connection relationship between the first game client and the target virtual server, the target watching payload serves as an adjustment basis and the process number of the target processes which are deployed in the cloud and used for synchronously displaying in the first game client the game picture of the virtual game battle in which the second game client participates is automatically adjusted, so that the coupling degree between various services in the game client is reduced, and the user experience during watching is ensured by the foregoing automatic adjustment mode.

Optionally, in this embodiment, as shown in FIG. 3, a target watching request triggered on a first game client 302 is obtained, where the target watching request is used for requesting to synchronously display a game picture of a virtual game battle in which a second game client (such as a game client where a player C is) participates in the first game client 302; a communication connection relationship between the first game client 302 and a target virtual server 304 is established in response to the target watching request, where the target virtual server 304 includes one group of target processes (such as a target process 304-1, a target process 304-2 and a target process 304-3), the target processes are processes deployed in the cloud, the process number of one group of target processes is set to be adjusted according to a target payload associated with the virtual game battle, and the target watching payload is the number of resources born by the target processes during watching of the virtual game battle.

Optionally, in this embodiment, the target virtual server may be, not limited to a service deployed in the cloud, such as a game message consumer server (WatchPod). When a player in the game watches the game, the client is connected to a certain WatchPod first, and then a message is pulled from the cloud message queue for playback; The target virtual server may further be understood as, but not limited to one group of processes deployed to the cloud, and the number of the processes may be automatically expanded according to a current payload. It may basically achieve the decoupling from the current service through the foregoing target virtual server, and may automatically expand and retract according to the current service to dynamically reach a payload-balanced state, thereby ensuring the watching experience of the player.

Optionally, in this embodiment, the communication connection relationship may be but not limited to an association relationship that is actively or passively established by the first game client or the target virtual server in response to the target watching request triggered on the first game client. After the communication connection relationship is established, data transmission or information interaction between the first game client and the target virtual server may be performed by the communication connection relationship.

Optionally, in this embodiment, the virtual game battle in which the second game client participates may be but not limited to a virtual game battle corresponding to an internal logic service provided in the first game client, or may be but not limited to a virtual game battle corresponding to an internal logic service provided in a non-first game client, which is not limited herein. However, in a case that the virtual game battle in which the second game client participates is a virtual game battle corresponding to an internal logic service provided in the first game client, the problem of the serious coupling degree between various services in the game client will be more obvious, and it is more suitable for the implementation of the foregoing method for displaying the game picture.

Optionally, in this embodiment, the target watching payload is the number of resources born by the target processes during watching of the virtual game battle, where the number of the resources may be understood as, but not limited to, the number of users of the virtual game battle or the born traffic. Moreover, the size of the target watching payload may be, but not limited to, positively correlated to the number of the resources born by the target processes. For example, the more resources the target processes bear, the larger the target watching payload is, and vice versa. In addition, the process number of the target processes may be, but not limited to, positively correlated to the size of the target watching payload. For example, the larger the target watching payload is, the larger the process number of the target processes is, and vice versa.

Optionally, in this embodiment, the game picture data may include but not limited to game process data of the virtual game battle. Furthermore, in the process of synchronously displaying the game picture of the virtual game battle in the first game client, the first client may, but not limited to, flexibly adjust the display process of the game picture of the virtual game battle, and the display angle of the game picture of the virtual game battle, where the display angle may be understood as, but not limited to, the viewing angle corresponding to each client of the virtual game battle.

For further illustration, optionally, for example, as shown in FIG. 4, in the process of synchronously displaying the game picture of the virtual game battle in the first game client, a game picture 402 under the viewing angle associated with a client corresponding to an account identifier 404 is displayed in response to a playing request triggered on the account identifier 404.

A target watching request triggered on a first game client is obtained, where the target watching request is used for requesting to synchronously display in the first game client a game picture of a virtual game battle in which a second game client participates; a communication connection relationship between the first game client and the target virtual server is established in response to the target watching request, where the target virtual server includes one group of target processes, the target processes are processes deployed in the cloud, the process number of one group of the target processes is set to be adjusted according to a target watching payload associated with the virtual game battle, and the target watching payload is the number of resources born by the target processes during watching of the virtual game battle; game picture data of the virtual game battle transmitted by the target virtual server is received through the communication connection relationship, where the game picture data is data of the game picture of the virtual game battle waiting to be synchronously displayed in the first game client; and the game picture of the virtual game battle is synchronously displayed in the first game client.

For further illustration, optionally, for example, as shown in FIG. 5, obtain a target watching request 502-2 triggered on the first game client 502 to establish a communication connection relationship between a first game client 502 and a target virtual server 504, as shown in (a) in FIG. 5, where the target watching request 502-2 is used for requesting to synchronously display in the first game client a game picture of a virtual game battle in which a second game client participates 502; the target virtual server 504 includes one group of target processes (such as a target process 504-1, a target process 504-2 and a target process 504-3); and the target processes are processes deployed in the cloud.

Moreover, as shown in (b) in FIG. 5, in a case of the target virtual server 504 obtaining a target watching payload 506 associated with the virtual game battle, the process number of the target processes included in the target virtual server 504 is adjusted according to the target watching payload 506 to obtain the adjusted target virtual server 508 (such as a target process 504-1, a target process 504-2, a target process 504-3 and a target process 504-4), where the target watching payload 506 is the number of resources born by the target processes during watching of the virtual game battle.

In addition, as shown in (c) in FIG. 5, in a case of obtaining game picture data 508-2 of the virtual game battle by the adjusted target virtual server 508, the game picture data 508-2 is transmitted to the first game client 502 through the communication connection relationship so as to synchronously display the game picture of the virtual game battle in the first game client 502, where the game picture data 508-2 is data of the game picture of the virtual game battle waiting to be displayed in the first game client 502.

Through the embodiments provided by this application, a target watching request triggered on a first game client is obtained, where the target watching request is used for requesting to synchronously display in the first game client a game picture of a virtual game battle in which a second game client participates; a communication connection relationship between the first game client and the target virtual server is established in response to the target watching request, where the target virtual server includes one group of target processes, the target processes are processes deployed in the cloud, the process number of the target processes is set to be adjusted according to a target watching payload associated with the virtual game battle, and the target watching payload is the number of resources born by the target processes during watching of the virtual game battle; game picture data of the virtual game battle transmitted by the target virtual server is received through the communication connection relationship, where the game picture data is data of the game picture of the virtual game battle waiting to be synchronously displayed in the first game client; and The game picture of the virtual game battle is synchronously displayed in the first game client; and through the communication connection relationship between the first game client and the target virtual server, the target watching payload serves as an adjustment basis, and the process number of the target processes which are deployed in a cloud and used for synchronously displaying in the first game client the game picture of the virtual game battle in which the second game client participates is automatically adjusted, reaching the purpose that the process number of the target processes for synchronously displaying the game picture is adjusted in time, thereby achieving the technical effect of improving the display efficiency of the game picture.

As an optional solution, after a target watching request triggered on a first game client is obtained, the method includes:
S1: transmit the target watching request to a watching management process, where the watching management process is used for querying battle information of the virtual game battle; and
S2: in a case of obtaining battle effective information returned by the watching management process, set the first game client to a watching state, where the battle effective information is battle information of the virtual game battle found by the watching management process, and the first game client in the watching state is allowed to establish the communication connection relationship with the target virtual server. The battle information refers to specific information of the virtual game battle, and may include a battle identifier, a battle start time, a battle duration, and a battle participating object.

Optionally, in this embodiment, the watching management process may be but not limited to a watching event information management process, for managing event information transmitted by the watching service.

As an optional solution, the transmitting the target watching request to a watching management process includes:
transmit the target watching request to a non-event watching management process, and forward the target watching request to an event watching management process by the non-event watching management process.

Optionally, in this embodiment, in general, the game client is often configured with a non-event watching management process and an event watching management process; and to decouple an association relationship between a non-event service and an event service, it may be but not limited to that the target watching request is transmitted to the non-event watching management process, and then the non-event watching management process forwards the target watching request to the event watching management process. The non-event watching management process is used for forwarding the target watching request to the event watching management process. The event watching management process refers to querying battle information of the event virtual game battle, for example, the competition battle of a large-scale network game may be watched through the event watching management process.

Figure 8:
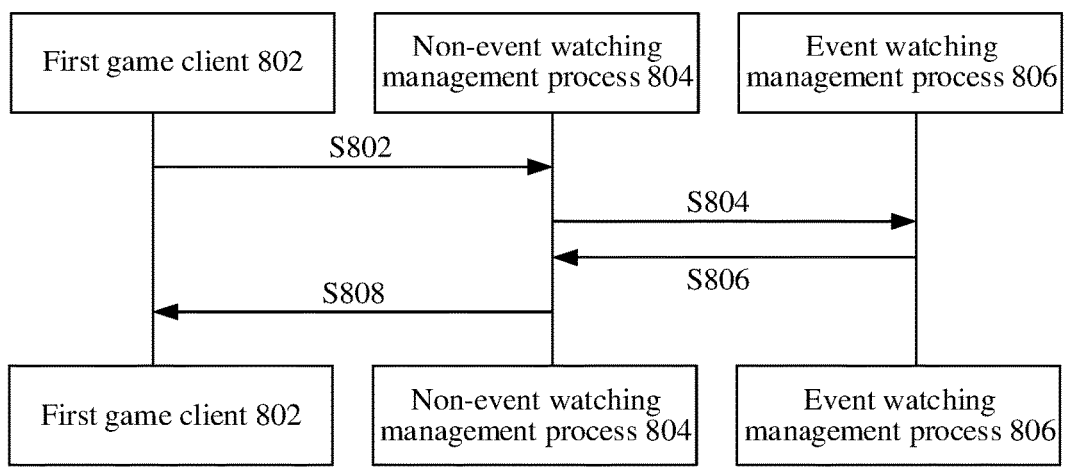
FIG. 8 is a schematic diagram showing another optional method for displaying a game picture according to an embodiment of this application.

For further illustration, optionally, for example, as shown in FIG. 8, the specific steps are as follows:
step S802: a first game client 802 transmits a target watching request to a non-event watching management process 804;
step S804: the non-event watching management process 804 forwards the target watching request to an event watching management process 806;
step S806: the event watching management process 806 returns battle effective information to the non-event watching management process 804; and
step S808: the non-event watching management process 804 forwards the battle effective information to the first game client 802.

Through the embodiments provided by this application, the target watching request is transmitted to a non-event watching management process, and the target watching request is forwarded to an event watching management process by the non-event watching management process, further reaching the purpose of reducing the coupling property between internal logic services of the game client and improving the display efficiency of the game picture.

As an optional solution, the establishing a communication connection relationship between the first game client and the target virtual server includes:
according to address information of the target virtual server included in the battle effective information, establish the communication connection relationship between the first game client and the target virtual server.

According to address information of the target virtual server included in the battle effective information, the communication connection relationship between the first game client and the target virtual server is established, where the address information of the target virtual server may be a virtual Internet protocol (IP) address of the target virtual server.

Figure 9:
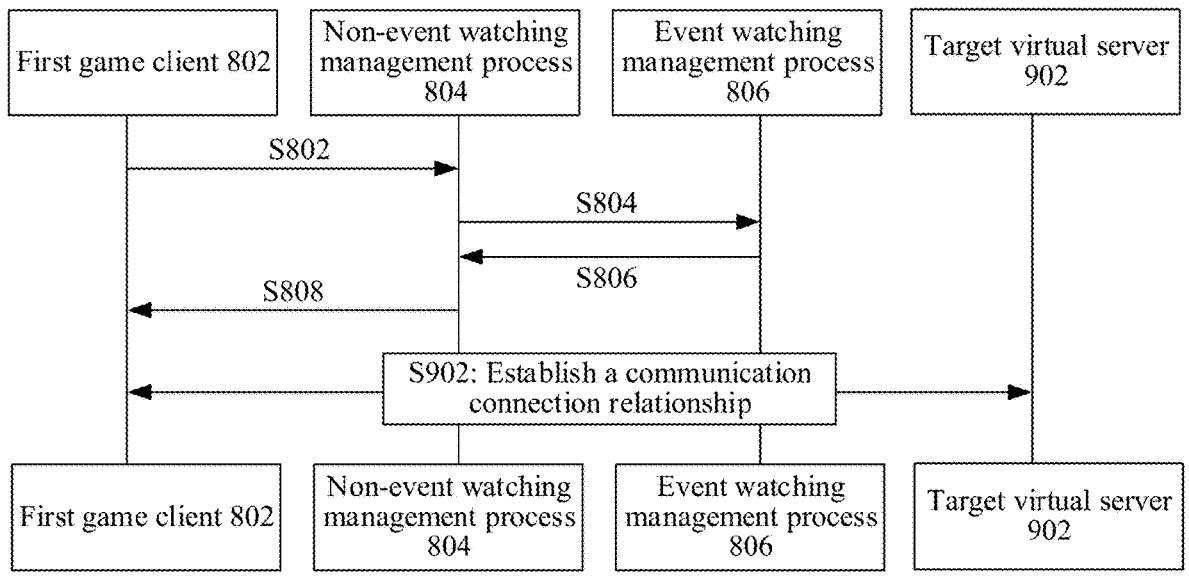
FIG. 9 is a schematic diagram showing another optional method for displaying a game picture according to an embodiment of this application.

For further illustration, optionally, based on the scenario shown in FIG. 8, for example, in the step S902 shown in FIG. 9, the communication connection relationship between the first game client 802 and the target virtual server 902 is established according to address information of the target virtual server included in the battle effective information.

Through the embodiments provided by this application, the communication connection relationship between the first game client and the target virtual server is established according to the address information of the target virtual server included in the battle effective information, reaching the purpose of pertinently establishing the communication connection relationship by the address information of the target virtual server and improving the establishment accuracy of the communication connection relationship.

In an optional solution, before a target watching request triggered on a first game client is obtained, the method includes:
display a target watching interface of the first game client, where a watching identifier corresponding to a game battle in which at least one client participates is displayed on the target watching interface, and the at least one client includes the second game client.

In an optional solution, the obtaining a target watching request triggered on a first game client includes: in a case of obtaining a selecting operation triggered on a target watching identifier, obtain the target watching request, where the watching identifier corresponding to the game battle in which the at least one client participates includes the target watching identifier.

Optionally, in this embodiment, the game picture data may include but not limited to game process data of the virtual game battle. Furthermore, in the process of synchronously displaying the game picture of the virtual game battle in the first game client, the first client may, but not limited to, flexibly adjust the display process of the game picture of the virtual game battle, and the display angle of the game picture of the virtual game battle, where the display angle may be understood as, but not limited to, the viewing angle corresponding to each client of the virtual game battle.

For further illustration, optionally, for example, as shown in FIG. 4, in the process of synchronously displaying the game picture of the virtual game battle in the first game client, a game picture 402 under the viewing angle associated with a client corresponding to an account identifier 404 in response to a playing request triggered on the account identifier 404.

As an optional solution, the method further includes:
S1: obtain a target running request triggered on a first game client, where the target running request is used for running a target virtual game on the first game client, and a battle of the target virtual game includes a virtual game battle; and
S2: display a game running picture of the target virtual game in which the first game client participates.

Optionally, the game client is essentially different from the livestreaming client generally configured to only provide a watching service, for example, the game client may provide, but not limited to an internal logic service of the virtual game in addition to providing the watching service of the virtual game, so that in the running process of the game client, the case that the watching service of the virtual game and the internal logic service of the virtual game are seriously coupled may easily exist, so that the livestreaming data generated by the watching service is forwarded by various logic services layer by layer in the process of providing the watching service for a watching party, thereby resulting in the limited number of participating objects which the watching service provided by the game client faces, generally, the watching object is only limited to the objects which have been eliminated in a single event.

In one embodiment, a user may use a first game client through a user terminal to participate in a target virtual game, that is, the user terminal may obtain a target running request triggered on the first game client when detecting that an operation event of starting the game is received, then the user terminal runs the target virtual game and displays the game running picture of the target virtual game in which the first game client participates, and the user may participate in the game through the game running picture.

In this embodiment, to overcome the problem of serious coupling degree between various services in the game client, through the communication connection relationship between the first game client and the target virtual server, the target watching payload serves as an adjustment basis and the process number of the target processes which are deployed in the cloud and used for synchronously displaying in the first game client the game picture of the virtual game battle in which the second game client participates is automatically adjusted, so that the coupling degree between various services in the game client is reduced, and the user experience during watching is ensured by the foregoing automatic adjustment mode.

As an optional solution, for the convenience of understanding, the foregoing method for displaying the game picture is applied to the watching scenario of a PVP event in an MMO game so as to meet the requirement of watching a high-level game competition by a large number of MMO players at the first time.

Optionally, in this embodiment, in view of the fact that the number of players who watch a game on line at the same time in an MMO game may reach ten thousand, even million magnitude. Furthermore, the amount of messages generated by recording an event is huge, so it is needed to consider what kind of message forwarding mechanism is adopted to meet the high-throughput service requirement.

In addition, a service side realizes a set of event message consumer services, and messages generated by all the watched competitions are directly pushed to a cloud message queue. When a player in the game watches the game, the client is connected to a certain event message consumer first, and then a message is pulled from the cloud message queue for playback. The event message consumer services is a serve deployed in the cloud, may be basically decoupled from the current service, and may automatically expand and retract according to the current service to dynamically reach a payload-balanced state, thereby ensuring the watching experience of the player.

Optionally, in this embodiment, in a game competitive event, a large number of players without event qualification watch the same competitive event in a third-party perspective in different game regions, personally observe and learn the game operations of other high-level players without participating the game process and without affecting the game competitive fairness to improve the competitive level. For example, the third-party player may select any interested player in the current competitive game as an observation object, and obtains the same real game experience in the perspective of the currently selected player.

A game service side only needs to classify various competition messages, and package and transmit the messages to the cloud message queue. A go language is adopted, so that the event message consumer server meets the adaption of a deployment requirement on the cloud, and the event message consumer server is completely decoupled from the current service process. In addition, connection of a large number of player clients is managed and cached, and the message is pulled from a cloud storage message queue for cache management. These caches may be reconstructed. In addition, direct deployment to the cloud may achieve the decoupling effect between the game service side and the watching service side.

Figure 10:
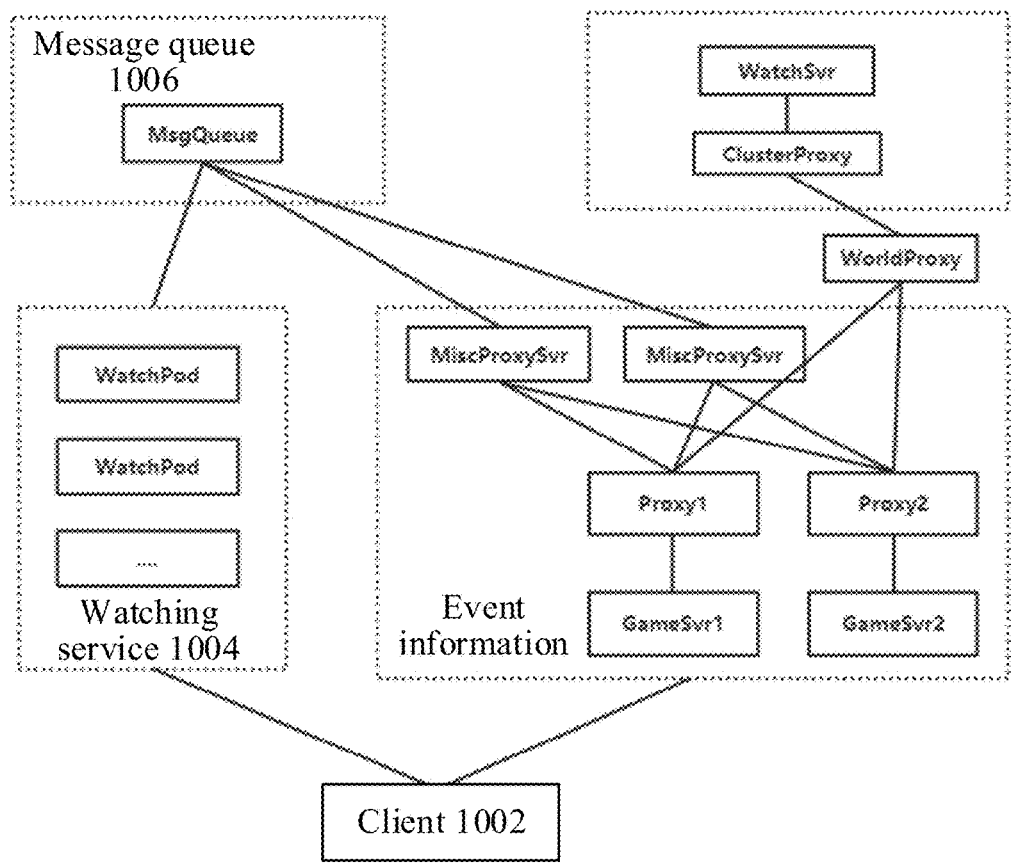
FIG. 10 is a schematic diagram showing another optional method for displaying a game picture according to an embodiment of this application.

For further illustration, optionally, for example, a watching service framework shown in FIG. 10, a client 1002 obtains event information stored in a message queue 1006 by a watching service 1004, and display the event information on the client 1002 in the form of the game picture.

Figure 11:
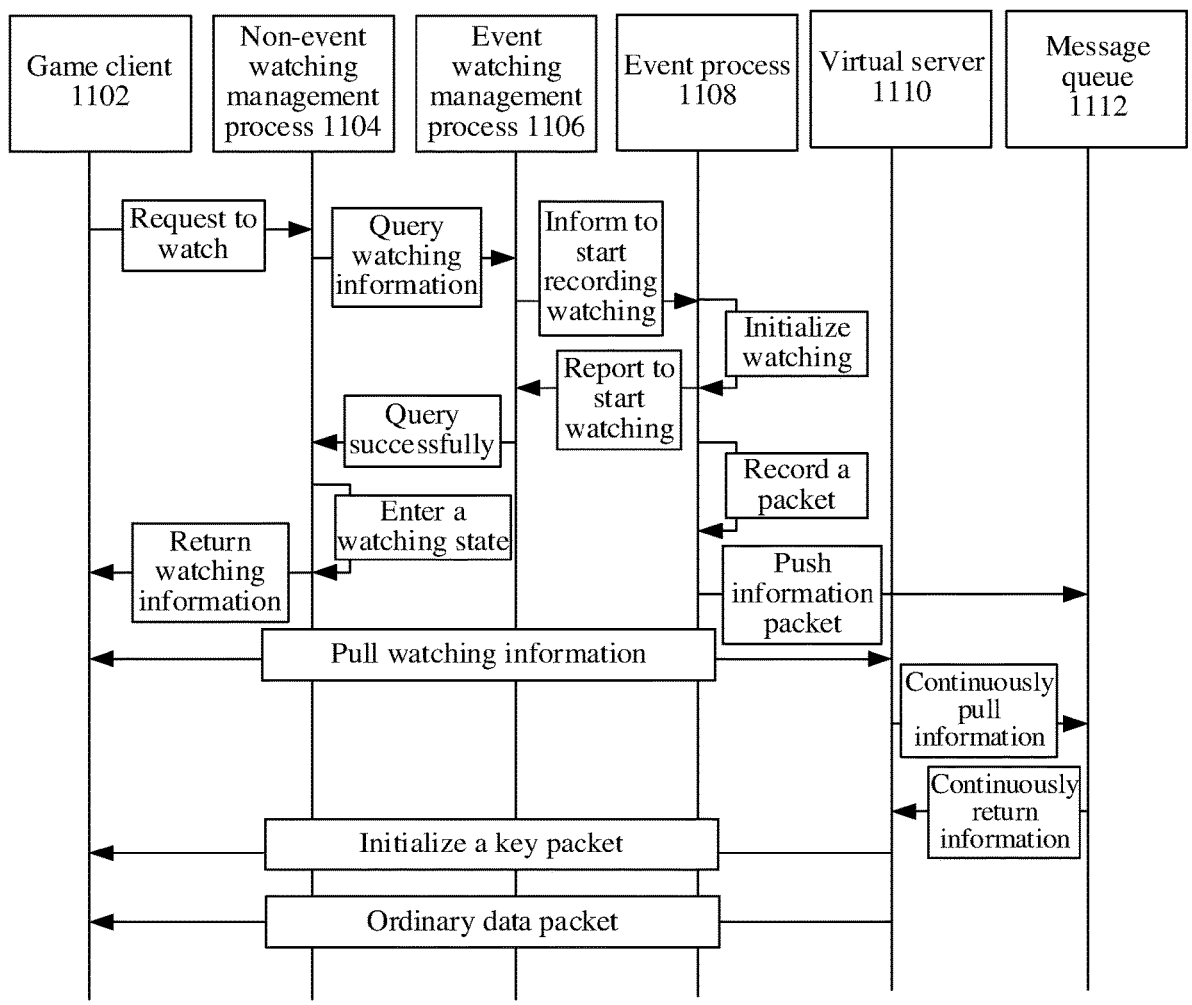
FIG. 11 is a schematic diagram showing another optional method for displaying a game picture according to an embodiment of this application.

Specifically, referring to the watching service message time sequence diagram shown in FIG. 11, a game client 1102 transmits a CS watching request to a non-event watching management process 1104, and the non-event watching management process 1104 transparently transmits the request to an event watching management process 1106 to query watching information; after receiving the request, the event watching management process 1106 queries whether there is on-the-spot game information, and informs an event process 1108 if there is no on-the-spot game information; the event information is initialized and reported, and the event watching management process 1106 returns the event information to a request side after receiving the event information; and if the on-the-spot game information can be found, the event information is directly returned. Meanwhile, the event process 1108 starts to record the current game, and a production message is pushed to a message queue 1112. After the non-event watching management process 1104 at the request side queries the event information, a player is set to a watching state, and the event information is returned to the game client 1102. After the game client 1102 receives the event information returned by the non-event watching management process 1104, the address of a virtual server 1110 inside is taken out and connected to the virtual server 1110. The virtual server 1110 is a group of processes deployed to the cloud, and the process number may be automatically expanded according to a current payload. The virtual server has two main functions: 1. consuming all event messages requested by the game client 1102 to watch from the message queue 1112, and sequentially caching the messages in events; and 2. receiving the watching request transmitted by the player game client 1102, taking protocol messages of the current event watched by the player out of the cache, and continuously pushing the protocol messages to the game client 1102.

In addition, after the game client 1102 receives the messages of the events to be watched from the virtual server 1110, and the messages are replayed sequentially.

Through the embodiments of this application, the demand of massive players to watch the same high-level competitive game in different game regions is met well, the coupling property between internal logical servers of products is reduced, and automatic expansion can be realized according to the current watching payload, thereby ensuring that the player has smoother watching experience.

It may be understood that in the specific implementation of this application, related data such as user information is involved, and when the above embodiments of this application are applied to specific products or technologies, permission or consent of the user is required, and the connection, use and processing of the related data need to comply with relevant laws, regulations and standards of relevant countries and regions.

To simplify the description, the foregoing method embodiments are described as a series of action combination. But persons of ordinary skill in the art should know that the present application is not limited to any described sequence of the action, as some steps can adopt other sequences or can be executed simultaneously according to the present application. In addition, a person skilled in the art should also know that all the embodiments described in the specification are examples, and the related actions and modules are not necessarily mandatory to this application.

Figure 12:
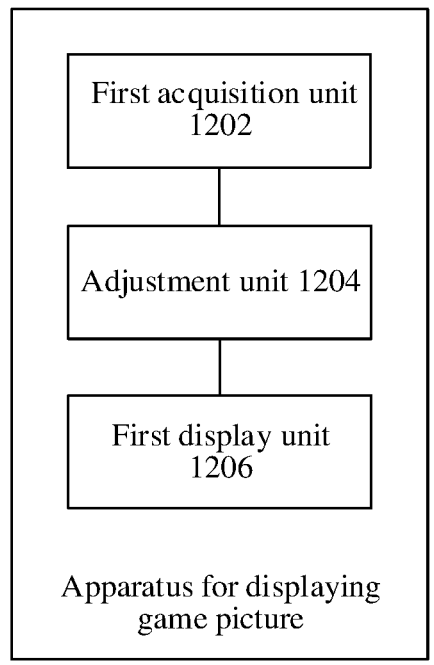
FIG. 12 is a schematic diagram showing an optional apparatus for displaying a game picture according to an embodiment of this application.

According to another aspect of the embodiments of this application, an apparatus for displaying a game picture, for implementing the foregoing method for displaying the game picture, is further provided. As shown in FIG. 12, the apparatus includes:

a first acquisition unit 1202, configured to obtain a communication connection relationship between the first game client and the target virtual server in response to a target watching request triggered on the first game client, where the target watching request is used for requesting to synchronously display in the first game client a game picture of a virtual game battle in which a second game client participates, the target virtual server includes one group of target processes, and the target processes are processes deployed in the cloud;

an adjustment unit 1204, configured to: in a case of obtaining a target watching payload associated with the virtual game battle, adjust the process number of the target processes included in the target virtual server according to the target watching payload, where the target watching payload is the number of resources born by the target processes during watching of the virtual game battle; and a first display unit 1206, configured to: in a case of obtaining the game picture data of the virtual game battle by the adjusted target virtual server, transmit the game picture data to the first game client through the communication connection relationship so as to synchronously display the game picture of the virtual game battle in the first game client, where the game picture data is data of the game picture of the virtual game battle waiting to be synchronously displayed in the first game client.

Optionally, the foregoing apparatus for displaying the game picture may be applied to, but not limited to a watching scenario of a competitive event of a virtual game. In view of the fact that the number of users who watch a game on line at the same time in a virtual game may reach ten thousand, even million magnitude. Furthermore, the amount of messages generated by recording an event is huge, so it is needed to consider what kind of message forwarding mechanism is adopted to meet the high-throughput service requirement. In this embodiment, when the game is watched in the game client, the client is connected to the target virtual server first, a communication connection relationship between the client and the target virtual server is established, and then a message (such as game picture data) is pulled from the message queue by the target virtual server to provide a corresponding watching service for the watching game client. Since the target virtual server is a service process deployed in the cloud, it may achieve the complete decoupling with a logic service of a current game client, and may realize automatic telescopic dynamic adjustment according to the target watching payload of a current watching service, so that the target virtual server is dynamically adjusted as a payload-balanced state, thereby improving the efficiency of the game picture corresponding to the watching service and ensuring the user experience of providing the watching service corresponding to the watching game client.

Optionally, the game client is essentially different from the livestreaming client generally configured to only provide a watching service, for example, the game client may provide, but not limited to an internal logic service of the virtual game in addition to providing the watching service of the virtual game, so that in the running process of the game client, the case that the watching service of the virtual game and the internal logic service of the virtual game are seriously coupled may easily exist, so that the livestreaming data generated by the watching service is forwarded by various logic services layer by layer in the process of providing the watching service for a watching party, thereby resulting in the limited number of participating objects which the watching service provided by the game client faces, generally, the watching object is only limited to the objects which have been eliminated in a single event.

In this embodiment, to overcome the problem of serious coupling degree between various services in the game client, through the communication connection relationship between the first game client and the target virtual server, the target watching payload serves as an adjustment basis and the process number of the target processes which are deployed in the cloud and used for synchronously displaying in the first game client the game picture of the virtual game battle in which the second game client participates is automatically adjusted, so that the coupling degree between various services in the game client is reduced, and the user experience during watching is ensured by the foregoing automatic adjustment mode.

Optionally, in this embodiment, the target virtual server may be, not limited to a service deployed in the cloud, such as a game message consumer server (WatchPod). When a player in the game watches the game, the client is connected to a certain WatchPod first, and then a message is pulled from the cloud message queue for playback; the target virtual server may further be understood as, but not limited to one group of processes deployed in the cloud, and the number of the processes may be automatically expanded according to a current payload; and It may basically achieve the decoupling from the current service through the foregoing target virtual server, and may automatically expand and retract according to the current service to dynamically reach a payload-balanced state, thereby ensuring the watching experience of the player.

Optionally, in this embodiment, the communication connection relationship may be but not limited to an association relationship that is actively or passively established by the first game client or the target virtual server in response to the target watching request triggered on the first game client. After the communication connection relationship is established, data transmission or information interaction between the first game client and the target virtual server may be performed by the communication connection relationship.

Optionally, in this embodiment, the virtual game battle in which the second game client participates may be but not limited to a virtual game battle corresponding to an internal logic service provided in the first game client, or may be but not limited to a virtual game battle corresponding to an internal logic service provided in a non-first game client, which is not limited herein. However, in a case that the virtual game battle in which the second game client participates is a virtual game battle corresponding to an internal logic service provided in the first game client, the problem of the serious coupling degree between various services in the game client will be more obvious, and it is also suitable for the implementation of the apparatus for displaying the foregoing game picture.

Optionally, in this embodiment, the target watching payload is the number of resources born by the target processes during watching of the virtual game battle, where the number of the resources may be understood as, but not limited to, the number of users of the virtual game battle or the born traffic. Moreover, the size of the target watching payload may be, but not limited to, positively correlated to the number of the resources born by the target processes. For example, the more resources the target processes bear, the larger the target watching payload is, and vice versa. In addition, the process number of the target processes may be, but not limited to, positively correlated to the size of the target watching payload. For example, the larger the target watching payload is, the larger the process number of the target processes is, and vice versa.

Optionally, in this embodiment, the game picture data may include but not limited to game process data of the virtual game battle. Furthermore, in the process of synchronously displaying the game picture of the virtual game battle in the first game client, the first client may, but not limited to, flexibly adjust the display process of the game picture of the virtual game battle, and the display angle of the game picture of the virtual game battle, where the display angle may be understood as, but not limited to, the viewing angle corresponding to each client of the virtual game battle.

The communication connection relationship between the first game client and the target virtual server is obtained in response to a target watching request triggered on the first game client, where the target watching request is used for requesting to synchronously display in the first game client a game picture of a virtual game battle in which a second game client participates, the target virtual server includes one group of target processes, and the target processes are processes deployed in the cloud. In a case of obtaining a target watching payload associated with the virtual game battle, the process number of the target processes included in the target virtual server is adjusted according to the target watching payload, where the target watching payload is the number of resources born by the target processes during watching of the virtual game battle. In a case of obtaining game picture data of the virtual game battle by the adjusted target virtual server, game picture data is transmitted to the first game client through the communication connection relationship so as to synchronously display the game picture of the virtual game battle in the first game client, where the game picture data is data of the game picture of the virtual game battle waiting to be displayed synchronously in the first game client.

The specific embodiment may be referenced to the example shown in the foregoing apparatus for displaying the game picture, and details are not described herein again in this example.

Through the embodiments provided by this application, the communication connection relationship between the first game client and the target virtual server is obtained in response to a target watching request triggered on the first game client, where the target watching request is used for requesting to synchronously display in the first game client a game picture of a virtual game battle in which a second game client participates, the target virtual server includes one group of target processes, and the target processes are processes deployed in the cloud. In a case of obtaining a target watching payload associated with the virtual game battle, the process number of the target processes included in the target virtual server is adjusted according to the target watching payload, where the target watching payload is the number of resources born by the target processes during watching of the virtual game battle. In a case of obtaining the game picture data of the virtual game battle by the adjusted target virtual server, the game picture data is transmitted to the first game client through the communication connection relationship so as to synchronously display the game picture of the virtual game battle in the first game client, where the game picture data is data of the game picture of the virtual game battle waiting to be synchronously displayed in the first game client. Through the communication connection relationship between the first game client and the target virtual server, the target watching payload serves as an adjustment basis, and the process number of the target processes which are deployed in the cloud and used for synchronously displaying in the first game client the game picture of the virtual game battle in which the second game client participates is automatically adjusted, reaching the purpose that the process number of the target processes for synchronously displaying the game picture is adjusted in time, thereby achieving the technical effect of improving the display efficiency of the game picture.

As an optional solution, the adjustment unit 1204 includes:
- an increasing module, configured to: in a case that the target watching payload is greater than or equal to a first payload threshold, increase the process number of the target processes included in the target virtual server; or
- a reducing module, configured to: in a case that the target watching payload is less than or equal to a second payload threshold, reduce the process number of the target processes included in the target virtual server.

The specific embodiment may be referenced to the example shown in the foregoing method for displaying the game picture, and details are not described herein again in this example.

As an optional solution, the adjustment unit 1204 includes:
- a first adjustment module, configured to: in a case that the target watching payload is within the first payload range, adjust the process number of the target processes included in the target virtual server to the process number corresponding to the first payload range; or
- a second adjustment module, configured to: in a case that the target watching payload is within the second payload range, adjust the process number of the target processes included in the target virtual server to the process number corresponding to the second payload range.

The specific embodiment may be referenced to the example shown in the foregoing method for displaying the game picture, and details are not described herein again in this example.

As an optional solution, the apparatus includes:
- a first transmitting unit, configured to: before transmitting the game picture data to the first game client through the communication connection relationship, transmit a data pulling request to a target message queue, where the target message queue is used for caching the game picture data of the virtual game battle, and the data pulling request is used for requesting to pull the game picture data cached in the target message queue; and
- a first receiving unit, configured to: before transmitting the game picture data to the first game client through the communication connection relationship, receive the game picture data returned by the target message queue.

The specific embodiment may be referenced to the example shown in the foregoing method for displaying the game picture, and details are not described herein again in this example.

As an optional solution, the first transmitting unit includes: a first transmitting module, configured to transmit the data pulling request to the target message queue, where the data pulling request further carries a battle identifier of the virtual game battle and a picture timestamp of the game picture of the virtual game battle; and
- the first receiving unit includes: a receiving module, configured to receive the game picture data that is returned by the target message queue and matches the battle identifier and the picture timestamp.

The specific embodiment may be referenced to the example shown in the foregoing method for displaying the game picture, and details are not described herein again in this example.

Figure 13:
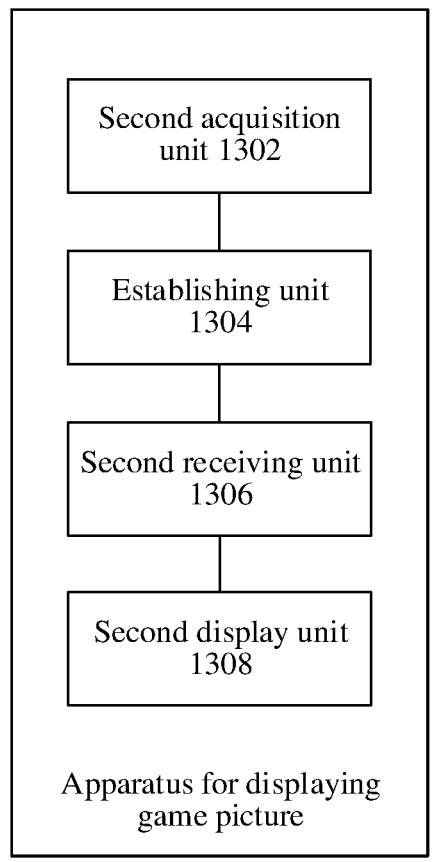
FIG. 13 is a schematic diagram of another optional apparatus for displaying a game picture according to an embodiment of this application.

According to another aspect of the embodiments of this application, an apparatus for displaying a game picture, for implementing the foregoing method for displaying the game picture, is further provided. As shown in FIG. 13, the apparatus includes:
- a second acquisition unit 1302, configured to obtain a target watching request triggered on a first game client, where the target watching request is used for requesting to synchronously display in the first game client a game picture of a virtual game battle in which a second game client participates;
- an establishing unit 1304, configured to establish a communication connection relationship between the first game client and a target virtual server in response to the target watching request, where the target virtual server includes one group of target processes, the target processes are processes deployed in the cloud, the process number of one group of target processes is set to be adjusted according to a target watching payload associated with the virtual game battle, and the target watching payload is the number of resources born by the target processes during watching of the virtual game battle;
- a second receiving unit 1306, configured to receive game picture data of the virtual game battle transmitted by the target virtual server through the communication connection relationship, where the game picture data is data of the game picture of the virtual game battle waiting to be synchronously displayed in the first game client; and
- a second display unit 1308, configured to synchronously display the game picture of the virtual game battle in the first game client.

Optionally, the foregoing apparatus for displaying the game picture may be applied to, but not limited to a watching scenario of a competitive event of a virtual game. In view of the fact that the number of users who watch a game on line at the same time in a virtual game may reach ten thousand, even million magnitude. Furthermore, the amount of messages generated by recording an event is huge, so it is needed to consider what kind of message forwarding mechanism is adopted to meet the high-throughput service requirement. In this embodiment, when the game is watched in the game client, the client is connected to the target virtual server first, a communication connection relationship between the client and the target virtual server is established, and then a message (such as game picture data) is pulled from the message queue by the target virtual server to provide a corresponding watching service for the watching game client. Since the target virtual server is a service process deployed in the cloud, it may achieve the complete decoupling with a logic service of a current game client, and may realize automatic telescopic dynamic adjustment according to the target watching payload of a current watching service, so that the target virtual server is dynamically adjusted as a payload-balanced state, thereby improving the efficiency of the game picture corresponding to the watching service and ensuring the user experience of providing the watching service corresponding to the watching game client.

Optionally, the game client is essentially different from the livestreaming client generally configured to only provide a watching service, for example, the game client may provide, but not limited to an internal logic service of the virtual game in addition to providing the watching service of the virtual game, so that in the running process of the game client, the case that the watching service of the virtual game and the internal logic service of the virtual game are seriously coupled may easily exist, so that the livestreaming data generated by the watching service is forwarded by various logic services layer by layer in the process of providing the watching service for a watching party, thereby resulting in the limited number of participating objects which the watching service provided by the game client faces, generally, the watching object is only limited to the objects which have been eliminated in a single event.

In this embodiment, to overcome the problem of serious coupling degree between various services in the game client, through the communication connection relationship between the first game client and the target virtual server, the target watching payload serves as an adjustment basis and the process number of the target processes which are deployed in the cloud and used for synchronously displaying in the first game client the game picture of the virtual game battle in which the second game client participates is automatically adjusted, so that the coupling degree between various services in the game client is reduced, and the user experience during watching is ensured by the foregoing automatic adjustment mode.

Optionally, in this embodiment, the target virtual server may be, but not limited to a service deployed in the cloud, such as a game message consumer server (WatchPod). When a player in the game watches the game, the client is connected to a certain WatchPod first, and then a message is pulled from the cloud message queue for playback. the target virtual server may further be understood as, but not limited to one group of processes deployed in the cloud, and the number of the processes may be automatically expanded according to a current payload; and It may basically achieve the decoupling from the current service through the foregoing target virtual server, and may automatically expand and retract according to the current service to dynamically reach a payload-balanced state, thereby ensuring the watching experience of the player.

Optionally, in this embodiment, the communication connection relationship may be but not limited to an association relationship that is actively or passively established by the first game client or the target virtual server in response to the target watching request triggered on the first game client. After the communication connection relationship is established, data transmission or information interaction between the first game client and the target virtual server may be performed by the communication connection relationship.

Optionally, in this embodiment, the virtual game battle in which the second game client participates may be but not limited to a virtual game battle corresponding to an internal logic service provided in the first game client, or may be but not limited to a virtual game battle corresponding to an internal logic service provided in a non-first game client, which is not limited herein. However, in a case that the virtual game battle in which the second game client participates is a virtual game battle corresponding to an internal logic service provided in the first game client, the problem of the serious coupling degree between various services in the game client will be more obvious, and it is also suitable for the implementation of the apparatus for displaying the foregoing game picture.

Optionally, in this embodiment, the target watching payload is the number of resources born by the target processes during watching of the virtual game battle, where the number of the resources may be understood as, but not limited to, the number of users of the virtual game battle or the born traffic. Moreover, the size of the target watching payload may be, but not limited to, positively correlated to the number of the resources born by the target processes. For example, the more resources the target processes bear, the larger the target watching payload is, and vice versa. In addition, the process number of the target processes may be, but not limited to, positively correlated to the size of the target watching payload. For example, the larger the target watching payload is, the larger the process number of the target processes is, and vice versa.

Optionally, in this embodiment, the game picture data may include but not limited to game process data of the virtual game battle. Furthermore, in the process of synchronously displaying the game picture of the virtual game battle in the first game client, the first client may, but not limited to, flexibly adjust the display process of the game picture of the virtual game battle, and the display angle of the game picture of the virtual game battle, where the display angle may be understood as, but not limited to, the viewing angle corresponding to each client of the virtual game battle.

A target watching request triggered on a first game client is obtained, where the target watching request is used for requesting to synchronously display in the first game client a game picture of a virtual game battle in which a second game client participates; a communication connection relationship between the first game client and the target virtual server is established in response to the target watching request, where the target virtual server includes one group of target processes, the target processes are processes deployed in the cloud, the process number of the target processes is set to be adjusted according to a target watching payload associated with the virtual game battle, and the target watching payload is the number of resources born by the target processes during watching of the virtual game battle; game picture data of the virtual game battle transmitted by the target virtual server is received through the communication connection relationship, where the game picture data is data of the game picture of the virtual game battle waiting to be synchronously displayed in the first game client; and the game picture of the virtual game battle is synchronously displayed in the first game client.

The specific embodiment may be referenced to the example shown in the foregoing apparatus for displaying the game picture, and details are not described herein again in this example.

Through the embodiments provided by this application, a target watching request triggered on a first game client is obtained, where the target watching request is used for requesting to synchronously display in the first game client a game picture of a virtual game battle in which a second game client participates; a communication connection relationship between the first game client and the target virtual server is established in response to the target watching request, where the target virtual server includes one group of target processes, the target processes are processes deployed in the cloud, the process number of the target processes is set to be adjusted according to a target watching payload associated with the virtual game battle, and the target watching payload is the number of resources born by the target processes during watching of the virtual game battle; game picture data of the virtual game battle transmitted by the target virtual server is received through the communication connection relationship, where the game picture data is data of the game picture of the virtual game battle waiting to be synchronously displayed in the first game client; and The game picture of the virtual game battle is synchronously displayed in the first game client; and through the communication connection relationship between the first game client and the target virtual server, the target watching payload serves as an adjustment basis, and the process number of the target processes which are deployed in a cloud and used for synchronously displaying in the first game client the game picture of the virtual game battle in which the second game client participates is automatically adjusted, reaching the purpose that the process number of the target processes for synchronously displaying the game picture is adjusted in time, thereby achieving the technical effect of improving the display efficiency of the game picture.

As an optional solution, the apparatus includes:
a second transmitting unit, configured to: after the obtaining a target watching request triggered on a first game client, transmit the target watching request to a watching management process, where the watching management process is used for querying battle information of the virtual game battle; and
a setting unit, configured to: after obtaining a target watching request triggered on a first game client, in a case of obtaining battle effective information returned by the watching management process, set the first game client to a watching state, where the battle effective information is battle information of the virtual game battle found by the watching management process, and the first game client in the watching state is allowed to establish the communication connection relationship with the target virtual server.

The specific embodiment may be referenced to the example shown in the foregoing method for displaying the game picture, and details are not described herein again in this example.

As an optional solution, the second transmitting unit includes:
A second transmitting module, configured to transmit the target watching request to a non-event watching management process, and forward the target watching request to an event watching management process by the non-event watching management process.

The specific embodiment may be referenced to the example shown in the foregoing method for displaying the game picture, and details are not described herein again in this example.

As an optional solution, the establishing unit 1304 includes:
an establishing module, configured to: according to address information of the target virtual server included in the battle effective information, establish the communication connection relationship between the first game client and the target virtual server.

The specific embodiment may be referenced to the example shown in the foregoing method for displaying the game picture, and details are not described herein again in this example.

As an optional solution, the apparatus includes:
a third display unit, configured to: before obtaining a target watching request triggered on a first game client, display a target watching interface first game client, a watching identifier corresponding to a game battle in which at least one client participates is displayed on the target watching interface, and least one client includes second game client.

The second obtaining unit 1302 includes: an acquisition module, configured to: before obtaining a target watching request triggered on a first game client, in a case of obtaining a selecting operation triggered on a target watching identifier, obtain the target watching request, where the watching identifier corresponding to the game battle in which the at least one client participates includes the target watching identifier.

The specific embodiment may be referenced to the example shown in the foregoing method for displaying the game picture, and details are not described herein again in this example.

As an optional solution, the apparatus further includes:
a third acquisition unit, configured to obtain a target running request triggered on a first game client, where the target running request is used for running a target virtual game on the first game client, and a battle of the target virtual game includes a virtual game battle; and
a fourth display unit, configured to display a game running picture of the target virtual game in which the first game client participates.

The specific embodiment may be referenced to the example shown in the foregoing method for displaying the game picture, and details are not described herein again in this example.

Figure 14:
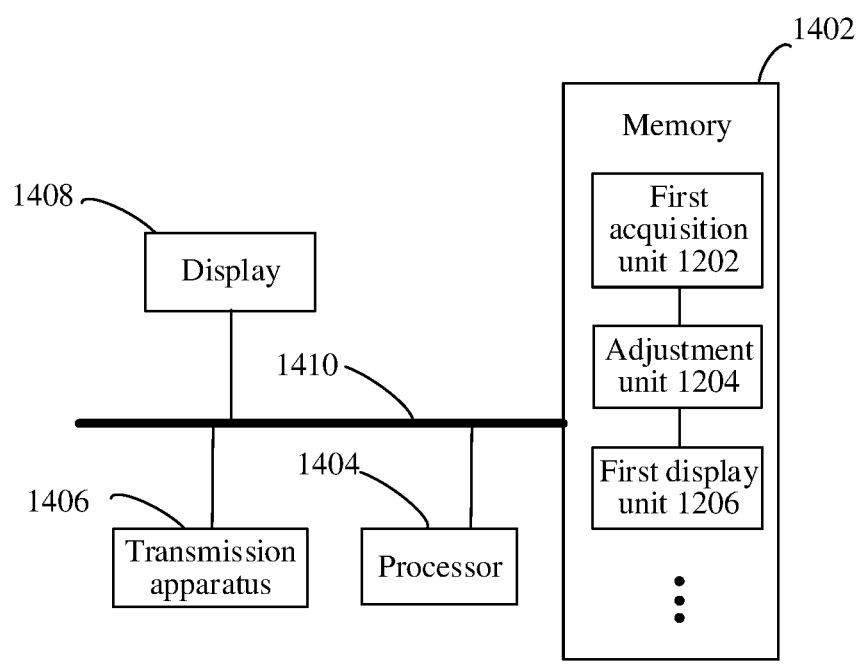
FIG. 14 is a structural schematic diagram of an optional electronic device according to an embodiment of this application.

According to yet another aspect of the embodiments of this application, an electronic device for implementing the foregoing method for displaying the game picture is further provided. As shown in FIG. 14, the electronic device includes a memory 1402 and a processor 1404, where a computer program is stored in the memory 1402, and the processor 1404 is set to perform the steps of any one of the method embodiments through the computer program.

Optionally, in this embodiment, the foregoing electronic device may be located in at least one of a plurality of network devices in a computer network.

Optionally, in this embodiment, the foregoing processor may be set to perform the following steps through the computer program:
S1: obtain the communication connection relationship between the first game client and the target virtual server in response to a target watching request triggered on the first game client, where the target watching request is used for requesting to synchronously display in the first game client a game picture of a virtual game battle in which a second game client participates, the target virtual server includes one group of target processes, and the target processes are processes deployed in the cloud;
S2: in a case of obtaining a target watching payload associated with the virtual game battle, adjust the process number of the target processes included in the target virtual server according to the target watching payload, where the target watching payload is the number of resources born by the target processes during watching of the virtual game battle; and S3: in a case of obtaining the target livestreaming data of the virtual game battle by the adjusted target virtual server, transmit target livestreaming data to the first game client through the communication connection relationship so as to synchronously display the game picture of the virtual game battle in the first game client, where the target livestreaming data is data of the game picture of the virtual game battle to be synchronously displayed in the first game client; or S1: obtain a target watching request triggered on a first game client, where the target watching request is used for requesting to synchronously display in the first game client a game picture of a virtual game battle in which a second game client participates;

S2: establish a communication connection relationship between the first game client and the target virtual server in response to the target watching request, where the target virtual server includes one group of target processes, the target processes are processes deployed in the cloud, the process number of one group of target processes is set to be adjusted according to a target watching payload associated with the virtual game battle, and the target watching payload is the number of resources born by the target processes during watching of the virtual game battle;

S3: receive target livestreaming data of the virtual game battle transmitted by the target virtual server through the communication connection relationship, where the target livestreaming data is data of the game picture of the virtual game battle waiting to be synchronously displayed in the first game client; and S4: synchronously display the game picture of the virtual game battle in the first game client.

Optionally, a person of ordinary skill in the art may understand that, the structure shown in FIG. 14 is only illustrative. The electronic device may be a terminal device such as a smartphone (such as an Android mobile phone or an iOS mobile phone), a tablet computer, a palmtop computer, a mobile Internet device (MID), or a PAD. FIG. 14 does not limit the structure of the foregoing electronic device. For example, the electronic device may further include more or less components (for example, a network interface) than those shown in FIG. 14, or has a configuration different from that shown in FIG. 14.

The memory 1402 may be configured to store a software program and a module, for example, a program instruction/module corresponding to a method and an apparatus for displaying the game picture in the embodiments of this application, and the processor 1404 performs various functional applications and data processing by running a software program and a module stored in the memory 1402, that is, implements the foregoing method for displaying the game picture. The memory 1402 may include a high-speed random memory, and may further include a non-volatile memory, for example, one or more magnetic storage apparatuses, a flash memory, or another nonvolatile solid-state memory. In some embodiments, the memory 1402 may further include memories remotely disposed relative to the processor 1404, and the remote memories may be connected to a terminal through a network. Examples of the foregoing network include, but are not limited to, the Internet, an intranet, a local area network, a mobile communication network, and a combination thereof. The memory 1402 specifically may be configured to, but not limited to, store information such as the target watching request, the target watching payload and the game picture data. As an example, as shown in FIG. 14, the foregoing memory 1402 may include but not limited to a first acquisition unit 1202, an adjustment unit 1204 and a first display unit 1206 (or a second acquisition unit 1302, an establishing unit 1304, a second receiving unit 1306 and a second display unit 1308 not shown in the figure) in the apparatus for displaying the game picture. In addition, the memory may further include but not limited to other module units in the foregoing apparatus for displaying the game picture, which will not be elaborated in this example.

Optionally, the foregoing transmission apparatus 1406 is configured to receive or send data by using a network. Specific examples of the foregoing network may include a wired network and a wireless network. In one example, the transmission apparatus 1406 includes a network interface controller (NIC). The NIC may be connected to another network device and a router by using a network cable so as to communicate with the Internet or a local area network. In one example, the transmission device 1406 is a radio frequency (RF) module, which communicates with the Internet in a wireless manner.

The foregoing electronic device further includes: a display 1408, configured to display information such as the foregoing target watching request, the target watching payload and the game picture data; and a connecting bus 1410, configured to connect various module parts in the foregoing electronic device.

In other embodiments, the foregoing terminal device or server may be a node in a distributed system, where the distributed system may be a blockchain system, and the blockchain system may be a distributed system formed by connecting a plurality of nodes through network communication. Nodes form peer to peer (P2P) network may be formed between nodes, any form of device, such as the server, the terminal and other electronic devices, may be added to the P2P network to become one node in the blockchain system.

According to one aspect of this application, a computer program product is provided. The computer program product includes a computer program/instruction; and the computer program/instruction includes a program code for performing the method shown in the flowchart. In such an embodiment, the computer program may be downloaded and installed from a network through the communication part, and/or installed from the removable medium. When being executed by a central processing unit, the computer program performs various functions provided in the embodiments of this application.

The sequence numbers of the foregoing embodiments of this application are merely for description purpose but do not imply the preference among the embodiments.

The computer system of the electronic device is merely an example, and does not constitute any limitation on functions and use ranges of the embodiments of this application.

The computer system includes a central processing unit (CPU), which may perform various suitable actions and processing based on a program stored in a read-only memory (ROM) or a program pay loaded from a storage part into a random access memory (RAM). The RAM further stores various programs and data required for system operations. The CPU, the ROM and the RAM are connected to each other through a bus. An input/output (I/O) interface is also connected to the bus.

The following parts are connected to the input/output interface: an input part including a keyboard, a mouse and the like; an output part including a cathode ray tube (CRT), a liquid crystal display (LCD), a loudspeaker and the like; a storage part including a hard disk and the like; and a communication part including a network interface card such as a local area network card and a modem. The communication part performs communication processing by using a network such as the Internet. A driver is also connected to the I/O interface as required. A removable medium, such as a magnetic disk, an optical disc, a magneto-optical disk, or a semiconductor memory, is installed on the drive as required, so that a computer program read from the removable medium is installed into the storage part as required.

In particular, according to the embodiments of this application, the processes described in various flowcharts may be implemented as computer software programs. For example, this embodiment of this application includes a computer program product, the computer program product includes a computer program carried on a computer-readable medium, and the computer program includes program code used for performing the methods shown in the flowcharts. In such an embodiment, the computer program may be downloaded and installed from a network through the communication part, and/or installed from the removable medium. When being executed by the CPU, the computer program performs various functions defined in the system of this application.

According to one aspect of this application, a computer-readable storage medium is provided. A process of the computer device reads the computer instruction from the computer-readable storage medium and executes the computer instruction so as to cause the computer device to perform the foregoing method provided in the above various optional implementations.

Optionally, in this embodiment, the foregoing storage medium may be set to store a computer program for performing the following steps:

S1: obtain the communication connection relationship between the first game client and the target virtual server in response to a target watching request triggered on the first game client, where the target watching request is used for requesting to synchronously display in the first game client a game picture of a virtual game battle in which a second game client participates, the target virtual server includes one group of target processes, and the target processes are processes deployed in the cloud;

S2: in a case of obtaining a target watching payload associated with the virtual game battle, adjust the process number of the target processes included in the target virtual server according to the target watching payload, where the target watching payload is the number of resources born by the target processes during watching of the virtual game battle; and S3: in a case of obtaining the game picture data of the virtual game battle by the adjusted target virtual server, transmit the game picture data to the first game client through the communication connection relationship so as to synchronously display the game picture of the virtual game battle in the first game client, where the game picture data is data of the game picture of the virtual game battle waiting to be synchronously displayed in the first game client; or S1: obtain a target watching request triggered on a first game client, where the target watching request is used for requesting to synchronously display in the first game client a game picture of a virtual game battle in which a second game client participates;

S2: establish a communication connection relationship between the first game client and the target virtual server in response to the target watching request, where the target virtual server includes one group of target processes, the target processes are processes deployed in the cloud, the process number of the target processes is set to be adjusted according to a target watching payload associated with the virtual game battle, and the target watching payload is the number of resources born by the target processes during watching of the virtual game battle;

S3: receive game picture data of the virtual game battle transmitted by the target virtual server through the communication connection relationship, where the game picture data is data of the game picture of the virtual game battle waiting to be synchronously displayed in the first game client; and S4: synchronously display the game picture of the virtual game battle in the first game client.

Optionally, in this embodiment, a person of ordinary skill in the art can understand that, all or some steps in the methods in the foregoing embodiments may be performed by a program instructing related hardware of a terminal device. The program may be stored in a computer-readable storage medium. The storage medium may include: a flash drive, a read-only memory (ROM), a random access memory (RAM), a magnetic disk, an optical disc, and the like.

The sequence numbers of the foregoing embodiments of this application are merely for description purpose but do not imply the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or a part contributing to the related art, or all or a part of the technical solution may be implemented in a form of a software product. The computer software product is stored in a storage medium and includes several instructions for instructing one or more computer devices (which may be a PC, a server, a network device or the like) to perform all or some of steps of the methods in the embodiments of this application.

In the foregoing embodiments of this application, the descriptions of the embodiments have respective focuses. For a part that is not described in detail in an embodiment, refer to related descriptions in other embodiments.

In the several embodiments provided in this application, it is to be understood that, the disclosed client may be implemented in another manner. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The foregoing integrated unit may be implemented in the form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications fall within the protection scope of this application.

What is claimed is:

1. A method for displaying a game picture comprising:
   obtaining a communication connection relationship between a first game client and a target virtual server in response to a target watching request triggered on the first game client, the target watching request being used for requesting to synchronously display in the first game client a game picture of a virtual game battle in which a second game client participates, and the target virtual server including one or more target processes;
   in response to obtaining a target watching payload associated with the virtual game battle, adjusting a process number of the one or more target processes included in the target virtual server according to the target watching payload, the target watching payload being a number of one or more resources born by the one or more target processes during watching of the virtual game battle; and
   in response to obtaining game picture data of the virtual game battle by the target virtual server after being adjusted, transmitting the game picture data to the first game client through the communication connection relationship so as to synchronously display the game picture of the virtual game battle in the first game client.

2. The method according to claim 1, wherein adjusting the process number includes:
   in response to the target watching payload being greater than or equal to a payload threshold, increasing the process number.

3. The method according to claim 1, wherein adjusting the process number includes:
   in response to the target watching payload being less than or equal to a payload threshold, reducing the process number.

4. The method according to claim 1, wherein adjusting the process number includes:
   in response to the target watching payload being within a payload range, adjusting the process number to a process number corresponding to the payload range.

5. The method according to claim 1, further comprising:
   transmitting a data pulling request to a target message queue, the target message queue being used for caching the game picture data of the virtual game battle, and the data pulling request being used for requesting to pull the game picture data cached in the target message queue; and
   receiving the game picture data returned by the target message queue.

6. The method according to claim 5, wherein:
   transmitting the data pulling request to the target message queue includes:
      transmitting the data pulling request to the target message queue, the data pulling request carrying a battle identifier of the virtual game battle and a picture timestamp of the game picture of the virtual game battle; and
   the receiving the game picture data returned by the target message queue includes:
      receiving the game picture data returned by the target message queue and matching the battle identifier and the picture timestamp.

7. A non-transitory computer-readable storage medium storing one or more computer programs that, when executed by one or more processors, cause the one or more processors to perform the method according to claim 1.

8. An electronic device comprising:
   one or more memories storing one or more computer programs; and
   one or more processors configured to execute the one or more computer programs to perform the method according to claim 7.

9. A non-transitory computer-readable storage medium storing one or more computer programs that, when executed by one or more processors, cause the one or more processors to perform the method according to claim 7.

10. A method for displaying a game picture comprising:
    obtaining a target watching request triggered on a first game client, the target watching request being used for requesting to synchronously display in the first game client a game picture of a virtual game battle in which a second game client participates;
    establishing a communication connection relationship between the first game client and a target virtual server in response to the target watching request, the target virtual server including one or more target processes, a process number of the one or more target processes being set to be adjusted according to a target watching payload associated with the virtual game battle, and the target watching payload being a number of one or more resources born by the one or more target processes during watching of the virtual game battle;
    through the communication connection relationship, receiving game picture data of the virtual game battle transmitted by the target virtual server; and
    synchronously displaying the game picture of the virtual game battle in the first game client.

11. The method according to claim 10, further comprising:
    transmitting the target watching request to a watching management process, the watching management process being used for querying battle information of the virtual game battle; and
    in response to obtaining battle effective information returned by the watching management process, setting the first game client to a watching state, the battle effective information being battle information of the virtual game battle found by the watching management process, and the first game client in the watching state being allowed to establish the communication connection relationship with the target virtual server.

12. The method according to claim 11, wherein transmitting the target watching request to the watching management process includes:
    transmitting the target watching request to a non-event watching management process, to enable the non-event watching management process to forward the target watching request to an event watching management process.

13. The method according to claim 11, wherein establishing the communication connection relationship between the first game client and the target virtual server includes:
- according to address information of the target virtual server included in the battle effective information, establishing the communication connection relationship between the first game client and the target virtual server.

14. The method according to claim 10, further comprising:
- displaying a target watching interface of the first game client, a watching identifier corresponding to a game battle in which at least one client participates being displayed on the target watching interface, and the at least one client including the second game client;
- wherein obtaining the target watching request triggered on the first game client includes:
  - in response to obtaining a selecting operation triggered on a target watching identifier, obtaining the target watching request, the watching identifier corresponding to the game battle in which the at least one client participates including the target watching identifier.

15. The method according to claim 10, further comprising:
- obtaining a target running request triggered on the first game client, the target running request being used for running a target virtual game on the first game client, and a battle of the target virtual game including the virtual game battle; and
- displaying a game running picture of the target virtual game in which the first game client participates.

16. An electronic device comprising:
- one or more memories storing one or more computer programs; and
- one or more processors configured to execute the one or more computer programs to:
  - obtain a communication connection relationship between a first game client and a target virtual server in response to a target watching request triggered on the first game client, the target watching request being used for requesting to synchronously display in the first game client a game picture of a virtual game battle in which a second game client participates, and the target virtual server including one or more target processes;
  - in response to obtaining a target watching payload associated with the virtual game battle, adjust a process number of the one or more target processes included in the target virtual server according to the target watching payload, the target watching payload being a number of one or more resources born by the one or more target processes during watching of the virtual game battle; and
  - in response to obtaining game picture data of the virtual game battle by the target virtual server after being adjusted, transmit the game picture data to the first game client through the communication connection relationship so as to synchronously display the game picture of the virtual game battle in the first game client.

17. The electronic device according to claim 16, wherein the one or more processors are further configured to execute the one or more computer programs to:
- in response to the target watching payload being greater than or equal to a payload threshold, increase the process number.

18. The electronic device according to claim 16, wherein the one or more processors are further configured to execute the one or more computer programs to:
- in response to the target watching payload being less than or equal to a payload threshold, reduce the process number.

19. The electronic device according to claim 16, wherein the one or more processors are further configured to execute the one or more computer programs to:
- in response to the target watching payload being within a payload range, adjust the process number to a process number corresponding to the payload range.

20. The electronic device according to claim 16, wherein the one or more processors are further configured to execute the one or more computer programs to:
- transmit a data pulling request to a target message queue, the target message queue being used for caching the game picture data of the virtual game battle, and the data pulling request being used for requesting to pull the game picture data cached in the target message queue; and
- receive the game picture data returned by the target message queue.

* * * * *